(12) United States Patent
Thompson

(10) Patent No.: US 6,529,620 B2
(45) Date of Patent: Mar. 4, 2003

(54) SYSTEM AND METHOD FOR OBTAINING AND UTILIZING MAINTENANCE INFORMATION

(75) Inventor: Robert Lee Thompson, Rogers, AR (US)

(73) Assignee: Pinotage, L.L.C., Fayetteville, AR (US)

( * ) Notice: Subject to any disclaimer, the term of this patent is extended or adjusted under 35 U.S.C. 154(b) by 0 days.

(21) Appl. No.: 09/951,021

(22) Filed: Sep. 12, 2001

(65) Prior Publication Data

US 2002/0033946 A1 Mar. 21, 2002

Related U.S. Application Data

(60) Provisional application No. 60/231,913, filed on Sep. 11, 2000.

(51) Int. Cl.$^7$ .................................................. G06K 9/00
(52) U.S. Cl. ........................................ 382/141; 701/29
(58) Field of Search ................................ 382/141, 152; 348/86, 125; 702/118; 378/43, 4; 701/29

(56) References Cited

U.S. PATENT DOCUMENTS

| | | | |
|---|---|---|---|
| 3,958,080 A | 5/1976 | Schadler | |
| 4,046,140 A | 9/1977 | Born | |
| 4,210,133 A | 7/1980 | Castaneda | |

(List continued on next page.)

FOREIGN PATENT DOCUMENTS

| | | |
|---|---|---|
| DE | 78 33 379 | 2/1979 |
| DE | 89 14 215 | 2/1991 |
| DE | 91 13 080.8 | 12/1991 |
| DE | 41 36 737 | 5/1992 |
| DE | 196 33 286 A | 2/1998 |
| EP | 0 501 088 | 9/1992 |
| EP | 0 581 286 A1 | 7/1993 |
| EP | 0 570 161 | 11/1993 |
| FR | 1 126 036 | 11/1956 |
| FR | 2 443 697 | 4/1980 |
| GB | 2 148 526 | 5/1985 |
| JP | 61 006 984 A | 1/1986 |
| JP | 63 287 176 A | 11/1988 |
| JP | 09196858 | 7/1997 |
| JP | 23 25 24 | 8/2000 |
| WO | WO 85/02101 | 5/1985 |
| WO | WO 91/04703 | 4/1991 |
| WO | WO 93/20741 | 10/1993 |
| WO | WO 94/10920 | 5/1994 |
| WO | WO 95/03001 A | 2/1995 |
| WO | WO 96/10947 | 4/1996 |
| WO | WO 97/11634 A | 3/1997 |
| WO | WO 97/50005 | 12/1997 |
| WO | WO 98/49929 | 11/1998 |

OTHER PUBLICATIONS

Joint Aviation Technical Data Integration, www.jatdi.redstone.army.mil/documentation/techcamguide, dated Jun. 26, 2000 (printed Oct. 18, 2002), 18 pages.

Primary Examiner—Samir Ahmed
Assistant Examiner—Vikkram Bali
(74) Attorney, Agent, or Firm—Wolf, Greenfield & Sacks, P.C.

(57) ABSTRACT

A system for obtaining, recording, displaying, storing, transmitting and receiving maintenance and other information is provided. The system, which may include an electronic maintenance apparatus that may be in the form of a handheld digital computer, allows a user to capture and store images, sound, and/or error codes and related text or voice data and other information concerning the system or object being maintained. The information can be stored locally and/or transmitted to remote locations. Retrieval of the images and other data at a later date provides an historical perspective of the object, enabling one using the maintenance apparatus to compare and contrast the condition of the object over time. Instruction on how to accomplish a job at hand, diagnostic information and/or support information may also be transmitted to and from the maintenance apparatus.

14 Claims, 10 Drawing Sheets

U.S. PATENT DOCUMENTS

| | | |
|---|---|---|
| 4,573,452 A | 3/1986 | Greenberg |
| 4,575,185 A | 3/1986 | Wentzell et al. |
| 4,621,284 A | 11/1986 | Nishioka et al. |
| 4,644,845 A | 2/1987 | Garehime, Jr. |
| 4,697,210 A | 9/1987 | Toyota et al. |
| 4,718,417 A | 1/1988 | Kittrell et al. |
| 4,736,733 A | 4/1988 | Adair |
| 4,738,526 A | 4/1988 | Larish |
| 4,745,471 A | 5/1988 | Takamura et al. |
| 4,759,348 A | 7/1988 | Cawood |
| 4,762,120 A | 8/1988 | Hussein |
| 4,791,479 A | 12/1988 | Ogiu et al. |
| 4,807,025 A | 2/1989 | Eino et al. |
| 4,816,828 A | 3/1989 | Feher |
| 4,831,456 A | 5/1989 | Takamura |
| 4,852,131 A * | 7/1989 | Armistead .................... 378/17 |
| 4,858,001 A | 8/1989 | Milbank et al. |
| 4,867,137 A | 9/1989 | Takahashi |
| 4,867,138 A | 9/1989 | Kubota et al. |
| 4,868,647 A | 9/1989 | Uehara et al. |
| 4,870,488 A | 9/1989 | Ikuno et al. |
| 4,878,113 A | 10/1989 | Nakamura |
| 4,888,639 A | 12/1989 | Yabe et al. |
| 4,890,159 A | 12/1989 | Ogiu |
| 4,893,613 A | 1/1990 | Hake |
| 4,895,138 A | 1/1990 | Yabe |
| 4,905,082 A | 2/1990 | Nishigaki et al. |
| 4,905,670 A | 3/1990 | Adair |
| 4,971,035 A | 11/1990 | Ito |
| 4,979,498 A | 12/1990 | Oneda et al. |
| 4,989,586 A | 2/1991 | Furukawa |
| 5,016,098 A | 5/1991 | Cooper et al. |
| 5,021,888 A | 6/1991 | Kondou et al. |
| 5,026,366 A | 6/1991 | Leckrone |
| 5,026,368 A | 6/1991 | Adair |
| 5,111,288 A | 5/1992 | Blackshear |
| 5,143,054 A | 9/1992 | Adair |
| 5,166,787 A | 11/1992 | Irion |
| 5,172,225 A | 12/1992 | Takahashi |
| 5,188,093 A | 2/1993 | Lafferty et al. |
| 5,188,094 A | 2/1993 | Adair |
| 5,193,525 A | 3/1993 | Silverstein et al. |
| 5,196,876 A | 3/1993 | Thayer |
| 5,217,453 A | 6/1993 | Wilk |
| 5,235,965 A | 8/1993 | Hiroya |
| 5,243,967 A | 9/1993 | Hibino |
| 5,251,613 A | 10/1993 | Adair |
| 5,257,618 A | 11/1993 | Kondo |
| 5,262,815 A | 11/1993 | Aumiller |
| 5,290,168 A | 3/1994 | Cooper et al. |
| 5,305,121 A | 4/1994 | Moll |
| 5,307,804 A | 5/1994 | Bonnet |
| 5,325,847 A | 7/1994 | Matsuno |
| 5,334,150 A | 8/1994 | Kaali |
| 5,359,992 A | 11/1994 | Hori et al. |
| 5,368,015 A | 11/1994 | Wilk |
| 5,374,953 A | 12/1994 | Sasaki et al. |
| 5,376,960 A | 12/1994 | Wurster |
| 5,379,756 A | 1/1995 | Pileski et al. |
| 5,380,291 A | 1/1995 | Kaali |
| 5,381,784 A | 1/1995 | Adair |
| 5,383,099 A | 1/1995 | Peters |
| 5,402,768 A | 4/1995 | Adair |
| 5,408,992 A | 4/1995 | Hamlin et al. |
| 5,417,210 A | 5/1995 | Funda et al. |
| 5,418,567 A | 5/1995 | Boers et al. |
| 5,431,645 A | 7/1995 | Smith et al. |
| 5,446,515 A | 8/1995 | Wolfe et al. |
| 5,508,735 A | 4/1996 | Mueller |
| 5,524,180 A | 6/1996 | Wang et al. |
| 5,558,619 A | 9/1996 | Kami et al. |
| 5,591,192 A | 1/1997 | Privitera et al. |
| 5,598,205 A | 1/1997 | Nishioka |
| 5,609,561 A | 3/1997 | Uehara et al. |
| 5,657,245 A | 8/1997 | Hecht et al. |
| 5,675,663 A | 10/1997 | Koerner et al. |
| 5,689,365 A | 11/1997 | Takahashi |
| 5,696,995 A | 12/1997 | Huang et al. |
| 5,704,892 A | 1/1998 | Adair |
| 5,762,603 A | 6/1998 | Thompson |
| 5,784,651 A | 7/1998 | Mauchan |
| 5,787,186 A | 7/1998 | Schroeder |
| 5,792,045 A | 8/1998 | Adair |
| 5,800,344 A | 9/1998 | Wood et al. |
| 5,828,969 A | 10/1998 | Chamney et al. |
| 5,846,249 A | 12/1998 | Thompson |
| RE36,041 E | 1/1999 | Turk et al. |
| 5,879,289 A | 3/1999 | Yarush et al. |
| 5,891,013 A | 4/1999 | Thompson |
| 5,928,137 A | 7/1999 | Green |
| 5,931,877 A | 8/1999 | Smith et al. |
| 5,956,077 A | 9/1999 | Qureshi et al. |
| 5,980,450 A | 11/1999 | Thompson |
| 5,986,718 A | 11/1999 | Barwacz et al. |
| 5,989,182 A | 11/1999 | Hori et al. |
| 5,991,429 A | 11/1999 | Coffin et al. |
| 6,002,740 A * | 12/1999 | Cerrina et al. ................ 378/35 |
| 6,007,484 A | 12/1999 | Thompson |
| 6,067,486 A | 5/2000 | Aragones et al. |
| 6,113,533 A | 9/2000 | Howes et al. |
| 6,141,482 A | 10/2000 | Massarksy |
| 6,142,876 A | 11/2000 | Cumbers |
| 6,147,701 A | 11/2000 | Tamura et al. |
| 6,148,148 A | 11/2000 | Wain et al. |
| 6,182,047 B1 | 1/2001 | Dirbas |
| 6,185,337 B1 | 2/2001 | Tsujino et al. |
| 6,229,904 B1 | 5/2001 | Huang et al. |
| 6,292,575 B1 | 9/2001 | Bortolussi et al. |
| 6,298,197 B1 | 10/2001 | Wain et al. |
| 6,301,370 B1 | 10/2001 | Steffens et al. |
| 6,323,761 B1 | 11/2001 | Son |
| 6,330,351 B1 * | 12/2001 | Yasunaga .................... 235/375 |
| 2001/0026631 A1 | 10/2001 | Slocum et al. |

* cited by examiner

SYSTEM AND METHOD FOR OBTAINING AND UTILIZING MAINTENANCE INFORMATION

CROSS-REFERENCE TO RELATED APPLICATIONS

This application claims the benefit of U.S. Provisional Patent Application No. 60/231,913, filed Sep. 11, 2000.

BACKGROUND

1. Field of the Invention

The present invention relates to maintenance systems and, more particularly, to systems and methods for obtaining and utilizing maintenance information.

2. Related Art

Maintenance logs are used to record maintenance information by personnel performing maintenance and inspection on objects, such as motors, aircraft, boats, machines, structures and buildings. These maintenance logs typically include information regarding the condition of the object and/or the work being performed on the object, and provide an historical record of such information. Typical logs take the form of notebooks, whereby the person performing the maintenance can write descriptions of the condition of the object and/or the work performed. The log can be maintained as a reference point for future maintenance and performance information regarding the object.

SUMMARY OF THE INVENTION

In one embodiment, a method of maintaining an object is provided. The method comprises the acts of storing, in digital format, a first image of the object at a first time, obtaining a second image of the object at a second time, comparing the first image to the second image, and determining whether to perform maintenance on the object based, at least in part, on the act of comparing.

In another embodiment, a method of inspecting an object from a remote location is provided. The method comprises the acts of obtaining a digital image of the object at a first location, electronically transmitting the digital image to a second location remote from the first location, viewing the digital image at the second location, transmitting instructions to the first location, and performing an act on the object in response to the instructions.

In yet another embodiment, an electronic inspection apparatus is provided. The apparatus is adapted to communicate with a camera to obtain an image of an object is provided. The apparatus comprises a casing, a computer disposed within the casing, and a camera control unit disposed within the casing and coupled to the computer. The camera control unit is adapted to receive electronic images from the camera, reformat the electronic images into digital format and pass the digitally formatted images to the computer. The apparatus also includes an input device, coupled to the computer, that is adapted to allow a user to input full text data relating to the image.

In still another embodiment, an electronic inspection apparatus is provided. The apparatus is adapted to communicate with a camera to obtain an image of an object. The apparatus comprises a casing, a computer disposed within the casing, and a camera control unit disposed within the casing and coupled to the computer. The camera control unit is adapted to receive electronic images from the camera, reformat the electronic images into digital format and pass the digitally formatted images to the computer. The apparatus further includes a computer readable storage medium, coupled to the computer, having an executable code stored thereon. The code allows the computer to execute at least two processes in a multitask fashion.

In another embodiment, an electronic inspection apparatus is provided the apparatus is adapted to communicate with a camera for obtaining an image of an object. The apparatus comprises a casing, a computer disposed within the casing, and a control unit disposed within the casing and coupled to the computer. The control unit is adapted to communicate with the camera. The apparatus further includes an input device coupled to the computer and the control unit. The input device is adapted to receive an input command from a user. The control unit is adapted to receive the command and signal at least portions of the camera to react as commanded.

In another embodiment, an aircraft inspection system is provided. The system includes a camera adapted to view a component of the aircraft, and a portable electronic apparatus communicating with the camera. The apparatus includes a casing, a computer disposed within the casing, and a camera control unit coupled to the computer and disposed within the casing. The camera control unit is adapted to receive an image from the camera and pass the image to the computer. The apparatus also includes a display coupled to the computer that is adapted to display the image. An input device is coupled to the computer and is adapted to allow a user to input maintenance data relating to the component. The apparatus further includes a storage medium communicating with the computer. The storage medium is adapted to store the image and related data.

In yet another embodiment, an electronic maintenance apparatus is provided. The apparatus is adapted to communicate with a camera to obtain an image of an object. The apparatus comprises a casing, a computer disposed within the casing, and a storage medium communicating with the computer. The storage medium includes maintenance information regarding the object being imaged.

BRIEF DESCRIPTION OF THE DRAWINGS

Various embodiments of the invention will now be described, by way of example, with reference to the accompanying drawings, in which.

DETAILED DESCRIPTION

Figure 1:
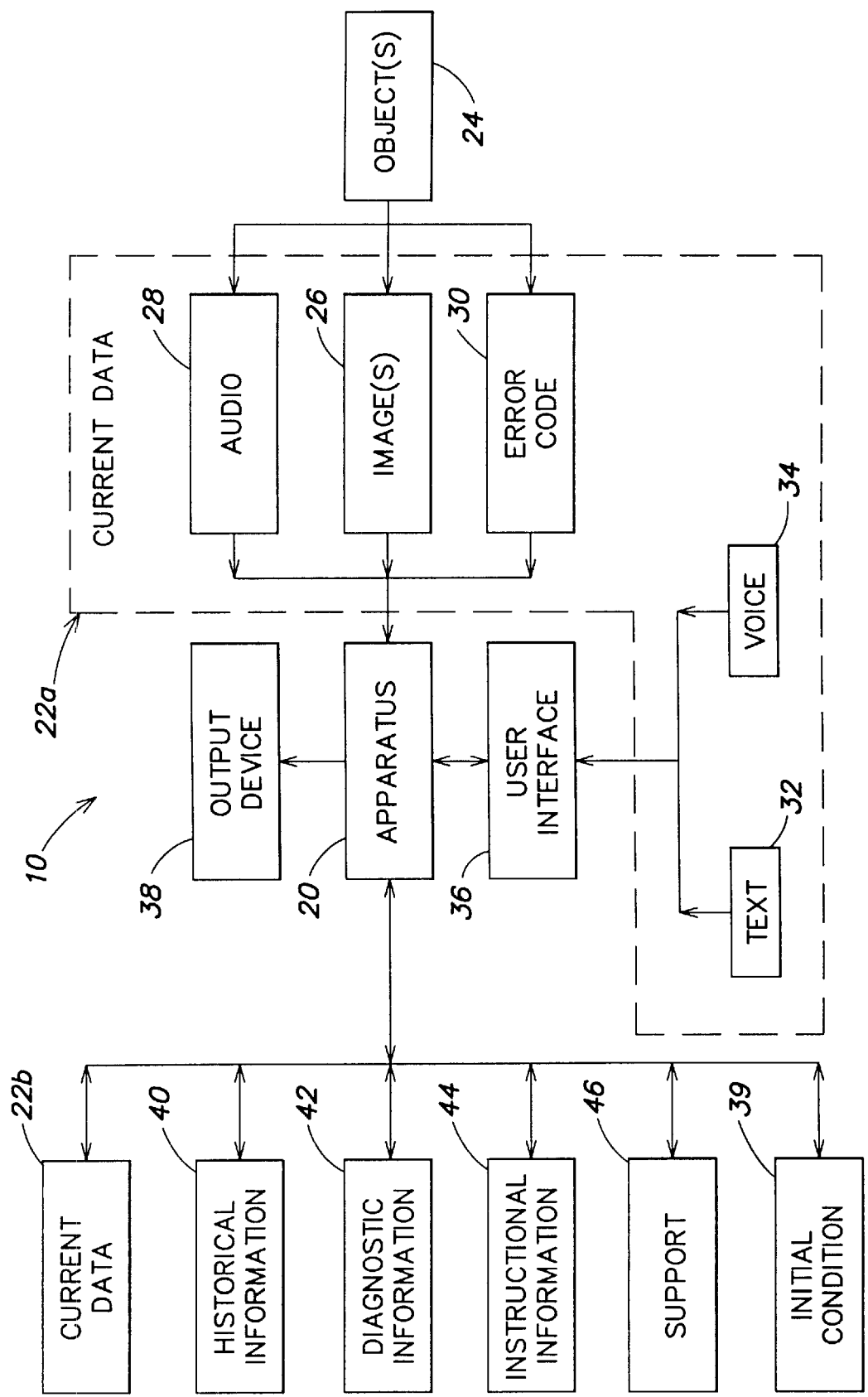
FIG. 1 is a schematic representation of a maintenance system according to one aspect of the invention.

Applicant's have appreciated that, after a short period of time, conventional log notebooks can become voluminous, torn, dirty, lost or destroyed. And, if they are to be read by people in places other than where they are stored, they must be copied and shipped, faxed, or transported in some manner to the desired location. Maintaining these notebooks is time consuming, costly and antiquated at best.

In one embodiment, a system for obtaining and storing maintenance information in electronic format is provided. The system includes an apparatus having an LCD, a touch panel, a camera connector, camera adjustments and a flashcard port. The apparatus houses a camera control unit (CCU) and a computer, which are used to receive and process images from an imager which is attached to the apparatus at the camera connector. This CCU and computer are also used to process images and data and place these images and data on a storage media such as a flashcard, which may be removably placed in the flashcard port. The apparatus also has attachment connectors for an external keyboard if one is desired by the user, external computer display video OUT and connectors as well as battery and external power connectors.

The apparatus may be used by maintenance personnel to capture images of the equipment or objects they are inspecting or maintaining as well as enter notes or detailed descriptions in writing or voice recording as adjuncts to the aforementioned images. The apparatus may also be wearable, battery powered, voice or touch activated. Once the pictures and data are captured and stored, they may be down loaded to other computers and or transmitted via the Internet or other transport methods. The storage media may be maintained with the apparatus in a separate housing carrying/storage case for permanent records that may stay with the apparatus for further reference.

It should be appreciated that the apparatus may use storage media which has been preformatted with desired maintenance programs that could contain parts list, training material, instructions for use, instructions on how to accomplish a job at hand, check list, operations manuals and other material not limited to the aforementioned.

Another feature is that the apparatus will enable the user to keep and maintain a wear history on mechanical objects (e.g., engine components) thus enabling the user to make judgments on when a part might fail prior the part actually failing.

Another embodiment of the present invention is directed to a method of maintaining a digital maintenance information. One embodiment of the present invention relates to a method of maintaining a digital maintenance information that includes pictures and/or text concerning the system being maintained. The use of pictures is particularly powerful, as it enables one viewing the maintenance apparatus to compare and contrast the manner in which a component of the system has worn over time. It should be appreciated that any suitable type of camera can be used to take such pictures.

In one embodiment of the present invention, a set of pictures can be taken of key components of a system before the system is sent to the customer. Thereafter, during periodic maintenance checks, additional pictures can be taken, which can enable one to view the maintenance apparatus to compare the way the parts have worn.

In one embodiment of the invention, a computer readable medium can be installed on the system to be maintained, so that the maintenance file can be stored therein. Optionally, the storage medium provided with the system can include pictures of certain components of the system when initially shipped to the customer, although the aspect of the present invention related to installing the digital maintenance file on the system to be maintained is not limited in this respect. Also, it should be appreciated that the embodiment of the present invention relating to installing the storage medium that stores the digital maintenance file on the system to be maintained is not limited to the use of a photographic maintenance file, as embodiments of the present invention contemplate that merely a text maintenance file can be employed.

It should be appreciated that it is an advantage of one embodiment of the present invention that the digital maintenance file is mounted to the system to be maintained, such that the maintenance file always stays with the system and can be accessed by maintenance personnel wherever the system is present, and further, cannot be lost. In addition, the maintenance file can be backed up and stored away from the system to be maintained to enhance the security of the data that comprises the digital maintenance file.

In another embodiment of the present invention, the apparatus can be provided with a video output, such that videotapes can be made of the digital pictures taken.

In another embodiment of the present invention, maintenance personnel can be provided with a remote system for recording digital information (photographic and/or text) while inspecting the system into a computer readable medium that they can carry around with them. This remote system can be cordless for ease of use (e.g., it can be battery powered). Once the inspection is complete, the remote system can be coupled to the storage medium installed on the system to be maintained and the information from the maintenance inspection can be downloaded into the digital maintenance file on the system.

Such a maintenance apparatus can be used with numerous types of systems, including aircraft (e.g., airplanes and helicopters), boats, automobiles, trucks, military equipment (e.g., tanks, etc.) and other systems as will be explained below.

One embodiment is directed to a method and apparatus for obtaining, recording, displaying, storing, transmitting and/or receiving maintenance and other information electronically, allowing a user to capture and store images, sound, error codes, related text or voice data and/or other information concerning the system or object being maintained. The information can be stored locally and/or transmitted to remote locations. Retrieval of the images and other information at a later date provides an historical perspective of the object, enabling one using the maintenance apparatus to compare and contrast the condition of the object over time. Instruction on how to accomplish a job at hand, diagnostic information and/or support information may also be transmitted to and from the maintenance apparatus. Such information may alternatively be pre-stored for later retrieval.

In one embodiment, the maintenance apparatus may be used as an interface between the object to be inspected and the person performing the inspection. The apparatus allows a user to receive maintenance information, such as historical and/or real-time information regarding the object, and determine a course for corrective action to be performed on the object as necessary. In this manner, a user may make maintenance judgments, such as, for example, whether the object needs maintenance or when the object might fail prior the object actually failing.

In one embodiment shown in FIG. 1, a maintenance system 10 includes a maintenance apparatus 20 that receives real-time or current data 22a concerning the condition of one or more objects 24, such as a mechanical component, being inspected. The data 22a concerning the object may relate to physical characteristics of the object 24, the interaction of two or more physical components, the operation of any object, such as the operating characteristics of any physical or electronic component, or any other characteristic of the object, as the present invention is not limited to receiving any particular types of data. The data 22a may be in the form of one or more images 26, audio 28 (e.g., the sound of the object as it functions), error codes 30, any suitable combination thereof, or any other data, as the present invention is not limited in this respect. The image 26 of the object may be generated by any image producing device as invention not limited in this respect. Similarly, audio 28 may be obtained with the use of any suitable device (e.g., a microphone), and the error code 30 may be obtained with any suitable interface. Notes or detailed descriptions in text format 32 or voice recording 34 may be input into the apparatus 20 as adjuncts to the aforementioned data 22a and may be inputted using a user interface 36. The data 22a may be presented to a user using one or more suitable output devices 38.

The maintenance apparatus 20 may store the data (labeled as 22b in FIG. 1) locally (e.g., in a storage medium of the apparatus 20) or remotely (e.g., at a central maintenance facility). The local storage medium may be internal or external to the apparatus 20 (e.g., in a separate housing carrying/storage case (not shown)), thereby providing a record that may stay with the apparatus 20 for further reference.

In one embodiment, the apparatus may provide access to maintenance information that may include, in addition to the present data 22b concerning the object, any one or more of the following: information regarding the initial condition 39 of the object; historical information 40 of the object; diagnostic information 42; instructional information 44 (e.g., parts list, training materials, instructions for use, instructions on how to accomplish a job at hand, check lists, operations manuals, layout information, schematic and parts diagrams, object location diagrams, etc.); and support 46 (e.g., help menu and/or real time technical assistance from technical support personnel when the apparatus is communicating with a maintenance facility or manufacturer/provider of the object 24). Such additional information may be stored locally (e.g., within the apparatus 20) or remotely, with the apparatus 20 having the capability to communicate with the remote location. Any of the above described information can be employed with the apparatus in any suitable combination.

The historical information 40 may be provided using any suitable technique. In one embodiment, the historical information 40 may include a compilation of maintenance and inspection data 22b previously obtained by the user or users. Data concerning the initial condition 39 of an object may be provided to a customer of the system for subsequent comparison with real time information. For example, a set of images can be taken of key components of a system before the system is sent to a customer. During periodic maintenance checks, additional images can be taken, which can enable one to view the maintenance apparatus to compare the current data with the initial condition information or historical information to determine the way the parts have worn.

As discussed above, in one embodiment, the system can communicate with a remote facility. This provides a number of advantages. For example, as may be the case with aircraft, maintenance for certain objects may be performed at different locations. Using the remote communication ability, an inspector at a first location may record his or her observations and upload the data 22b to a central database, so that an inspector at a second location may download that data prior to performing a subsequent inspection on the same aircraft.

In other embodiments of the invention, other techniques for providing a user with the most current data may be employed. For example, in one embodiment, a computer readable medium can be installed on the object to be maintained (e.g., installed on an aircraft), so that the maintenance information can be stored therein. Optionally, the storage medium provided with the object can include any of the types of data described above, including pictures of certain components of the object when initially shipped to the customer, although the aspect of the invention related to installing the maintenance information on the system to be maintained is not limited in this respect. Also, it should be appreciated that the embodiment of the present invention relating to installing the storage medium that stores the maintenance information on the object to be maintained is not limited to the use of image data, as embodiments of the present invention contemplate that text, audio, error code and/or other data can be employed.

An advantage of installing the maintenance information on the object to be maintained is that the maintenance information always stays with the object and can be accessed by maintenance personnel wherever the object is present, and cannot be lost. Once the inspection is complete, the apparatus can be coupled to the storage medium installed on the object to be maintained and the information from the maintenance inspection can be downloaded into the file stored on the object. In addition, the maintenance information can be backed up and stored away from the object to enhance the security of the data that comprises the maintenance information.

Figure 2:
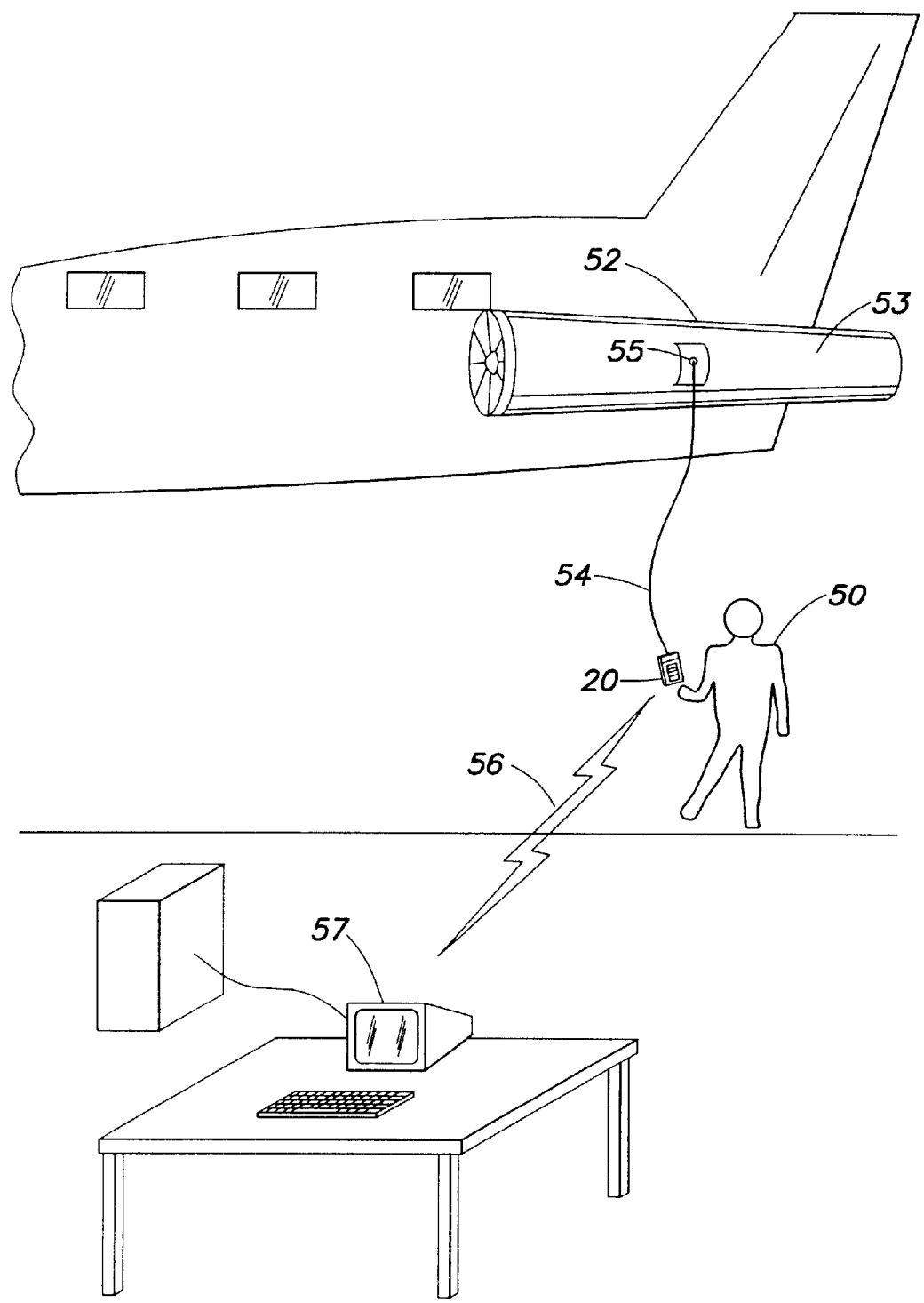
FIG. 2 is an illustration of an exemplary use of the system of FIG. 1.

Referring in relation to aircraft as shown in FIG. 2, an exemplary use of the maintenance system 10 will be described. A maintenance worker or inspector 50 inspects an engine 52 of an airplane using the maintenance apparatus 20 according to one embodiment of the present invention. The inspector 50 probes into the engine compartment 53 using a suitable data input device (such as a camera, scope, microphone, etc., (not shown)) coupled to the apparatus 20 via a link 54. An inspection port 55 formed on the engine housing 53 may be used to facilitate inserting the input device to enable the user to obtain the desired data. Data 22b (FIG. 1) is captured by the apparatus 20 for subsequent processing and analysis. In one embodiment, the inspector 50 inserts a camera 50 into the engine compartment to obtain an image of the engine.

The inspector 50, after obtaining the data, may record additional data, such as notes regarding the condition of the engine, the serial number of the engine, the date of inspection, the aircraft tail number or other identifier, the inspector's name, etc. This can be performed using a user interface 36 (FIG. 1) or the apparatus 20, which can be a keyboard, touch screen or any suitable interfaces as will be described below. The inspector 50 may also recall previously stored information regarding the engine, such as the aforementioned initial condition 39, historical information 40, diagnostic information 42 or instructional information, 44 and determine a course of action.

As discussed above, in one embodiment, the apparatus 20 may communicate with a remote facility through a suitable communications link (shown as 56 in FIG. 2). Link 56 can be any suitable communication medium, including wireless communication. The remote facility may include a computer 57 storing a database (not shown) capable of storing any of the above mentioned information concerning the object being inspected. Technicians at the remote facility may be able to remotely obtain and analyze the information obtained by the apparatus 20 to provide guidance to the inspector 50 regarding any action necessary. The communication of the apparatus with the remote facility enables technicians at a remote site to obtain the data in real time, thereby enhancing maintenance efficiency. Alternatively, the technician at the remote facility may view and analyze the maintenance information at a later time.

The maintenance apparatus 20 may also be used as a communication interface between an inspection facility and the object 24 being inspected. In this manner, an inspector can be posted at the remote location while a helper is located on site to manipulate the apparatus 20 and/or its associated data gathering device(s). This enables the remote inspector to obtain real time data and render a maintenance decision from a remote location without the need for a skilled technician on site with the object being inspected.

Rather than probe the object 24 to be inspected with a data gathering device coupled to the apparatus 20, one or more data gathering devices may be installed on the object to be inspected, with the apparatus 20 being capable of communicating with these devices. For example, an aircraft, ship or other object may be outfitted with several cameras capable of viewing certain areas within the object. The apparatus 20 may communicate with each of these cameras, via hardwire or wireless connection, to receive an image of the area to be inspected. Multiple views may also be generated to view an area from different locations and/or to view the interaction of multiple components.

The maintenance apparatus 20 may be implemented in any suitable manner, as the present invention is not limited in this respect. In one embodiment, the maintenance apparatus 20 is implemented as a portable hand-held digital computer/camera assembly. As is explained more fully below with reference to FIGS. 3–5, the assembly may be housed within a casing, resulting in the approximate size and weight of a laptop computer. For example, the hand-held apparatus may be up to about ten to fourteen inches long, up to about eight to twelve inches wide, and up to about one to four inches thick. The apparatus 20 may include or otherwise communicate with a storage medium and may also include a power source (e.g., a battery pack) that renders the apparatus cordless and easily transportable. In one embodiment, the apparatus 20 is less than about ten pounds. More preferably, the apparatus 20 is less than about five pounds, and most preferably, less than about three pounds. It should be appreciated that the power pack may comprise a large percentage of the weight. Thus, the weight of the apparatus 20 depends upon the size of the power pack included within the apparatus 20. With such a hand-held apparatus, increased portability and ease of use may be attained.

The illustrative embodiment of the apparatus 20 shown in FIGS. 3–5 includes several main components, including input devices 70*a*–70*f*, output devices 80*a*, 80*b*, 70*b*, 70*c*, a motherboard 90, a camera control unit 100, a video chip 110, and a casing 130, each of which will be discussed in more detail below. As discussed above, the data input to devices and the data output devices may be any number of devices, either internal to the apparatus or connected externally via any number of techniques, and in some instances, the input and output devices may be part of the same device. The data being inputted to or outputted from the apparatus 20 may be in any format, including but not limited to, still image data, streaming video images, text and audio, and may be sent to or received by the apparatus as desired. The motherboard 90 includes a central processing unit (CPU) 92, computer readable storage medium 94 coupled to the CPU 92 (e.g., via a bus (not shown)), and at least one input/output (I/O) connection 95 coupled to the CPU 92. The motherboard can be custom designed or can be any of a number of standard devices. The motherboard 90 controls data flow and storage, and works in conjunction with the video chip 110 and camera control unit 100 (CCU) to facilitate image processing and display.

The input devices 70*a*–70*f* provide the apparatus 20 with data. At least one of the devices provides a user interface. A user may be human or non-human, as in the case of an application program or another device. Any of a number of input devices may be employed. The apparatus 20 may have any number of internal input devices, disposed within the confines of the casing of the apparatus, as well as any number of external devices through suitable connections. The input devices can include control units, such as buttons, knobs or switches, keypads, touch screen, the other input devices and the output devices etc. to control various aspects of the apparatus. Human user input can also be obtained from an externally connected mouse, keyboard, joystick, glove, headset, microphone or any other manually controlled devices.

In one embodiment, a touch screen 70*a* is employed for human user input. In this embodiment, a touch screen controller 72 is connected to the touch screen 70*a* and the motherboard 90 and transfers the data from the touch screen 70*a* to the motherboard 90 for further processing and storage. Any of aforementioned external input or output devices may be attached to the apparatus 20 in numerous ways, via, for example, a connection port 74. The apparatus may also include voice recognition software, so that data may be input or the system may be controlled by voice. Voice recordings may also be stored in the apparatus 20.

Maintenance information previously stored on internal or external storage devices may also be inputted to the apparatus 20. Any suitable storage device may be employed, including the internal memory of the motherboard 90, harddrives or other storage media. In one embodiment, a flashcard 70*b* may be employed as a storage medium and may be installed through a PCMCIA (Personal Computer Memory Card International Association) card port 76. The flashcard 70*b* may be in addition to the memory already present on the motherboard 90. The flashcard 70*b* may be removable through the slot, or permanently attached to the apparatus 20 and contained within the device via a detachable, protective, screw-on covering 78. The card can be used to store preconfigured data.

Information stored on other devices can also be transmitted to the apparatus 20 via any of numerous communication mediums 70*c*, including but not limited to wireless communication media, such as cellular, satellite or infrared communication, modem connections, Ethernet connections, etc may be made through the PCMCIA port 76. Hardware enabling these communication mechanisms may be internal to the apparatus 20 in some embodiments and connected externally in others. Additionally, information may be transferred into the apparatus 20 via any of the numerous devices, for example: magnetic media (e.g., videotapes, audiotapes or floppy disks), optical media (e.g., CDs DVDs or laser disks), and electronic media (e.g., EPROM). One method of connection for any video input is an S-Video (Super-Video) connection port 79 hardwired to an S-Video-compatible device capable of reading the product. However, the present invention is not limited to this type of connection, as ports and devices formatted for other types of video signals may be employed, including, for example, a composite signal.

Figure 3:
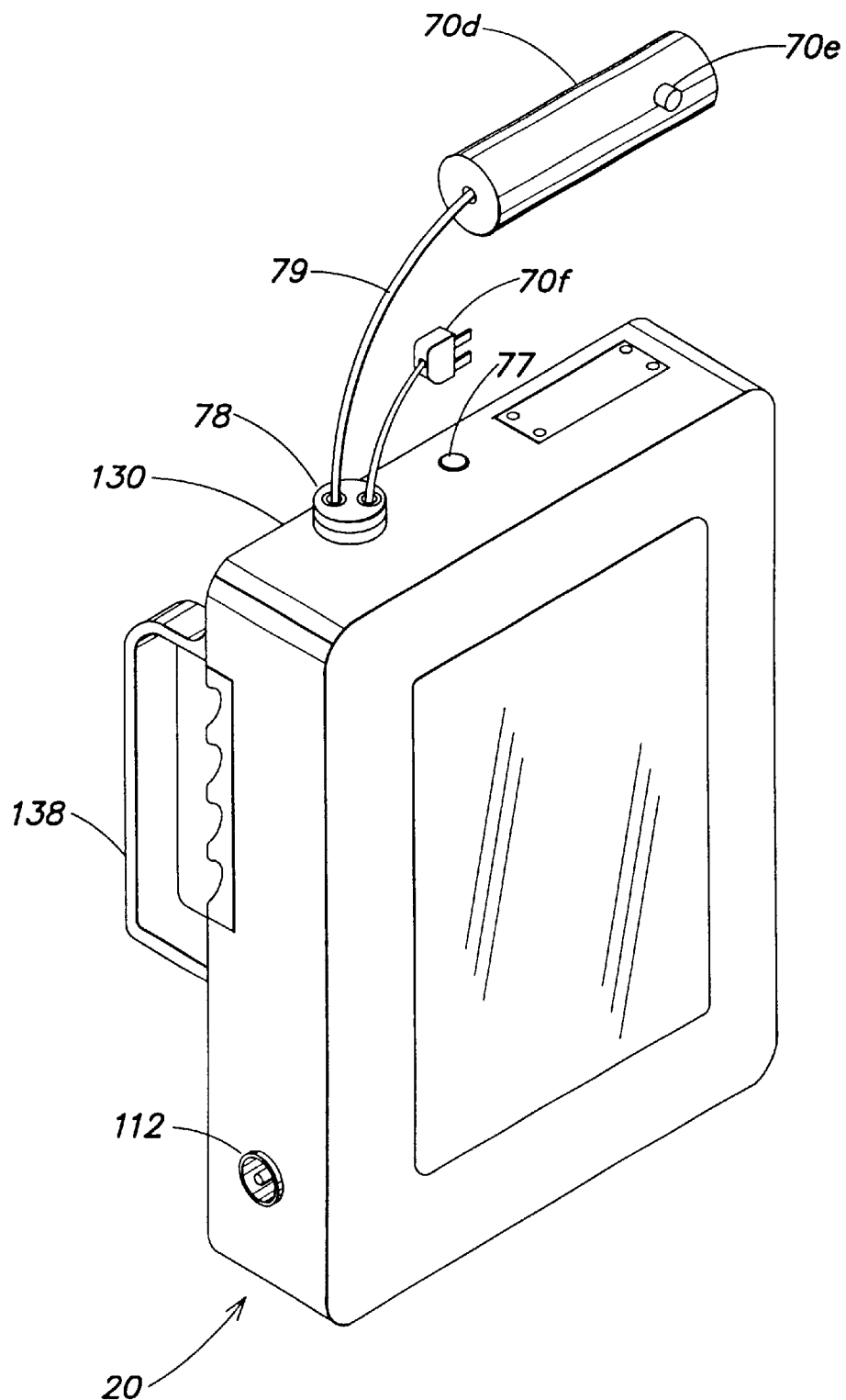
FIG. 3 is a perspective view of a maintenance apparatus for use with the system according to one embodiment of the invention.
Figure 4:
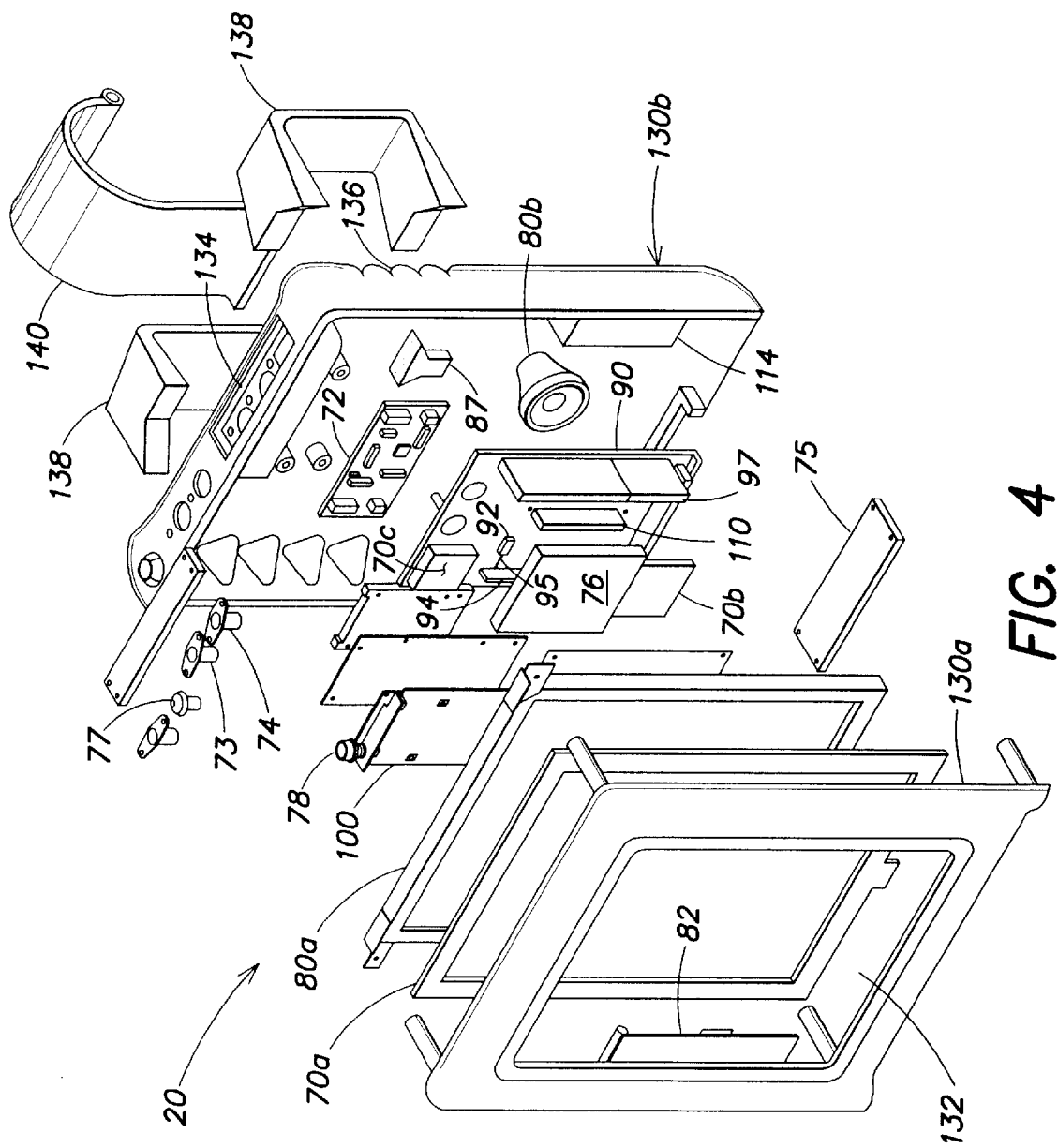
FIG. 4 is an exploded perspective view of the maintenance apparatus of FIG. 3.

As discussed above, in one embodiment the apparatus 20 is capable of receiving images from a camera, such as camera 70*d* shown in FIG. 3. Any suitable camera or cameras may be used, as the present invention is not limited in this respect. In one embodiment, the camera 70*d* is NTSC (National Television Standards Committee) compatible. NTSC is the one of several camera standards used in the United States. Examples of cameras that may be used with the apparatus 20 include the BoreCam™, the PeriCam™, the TeleCam™, and the ToolCam™, each available from Vision Technologies of Rogers, AR. Alternatively, cameras compatible with other television broadcast standards may be used, including those compatible with the PAL (Phase Alternate Line) or SECAM (Systeme Electronique Couleur Avec Memoire) systems, or any other type of camera.

The camera may be connected to the apparatus 20 in any suitable manner, as the present invention is not limited in this respect. In one embodiment, the camera 70*d* is connected to the apparatus 20 through port 78 on the apparatus 20 via an electronic cable 79. In another embodiment, an image sensor (e.g., a charge-couple device, also referred to as a CCD) is incorporated into the apparatus 20 rather than within the camera 70*d*, and a fiber optic cable extending from the camera may be employed. Further, a fiber optic cable may also be used to transmit digital code representative of the image viewed by the camera to the apparatus 20, even where the camera includes a CCD. Wireless, Ethernet or modem connections enabling data and image transfer from remote cameras or other sources may also be employed, as the present invention is not limited to the use of any particular connection technique.

Audio signals from the object being inspected may also be stored and/or transmitted via the apparatus 20. In one embodiment, the camera 70*d* may include a microphone 70*e* to pick up such audio. Alternatively, a separate probe including the microphone 70*e* or other such sound or vibration receiving device may be employed.

Error code signals may also be received by the apparatus 20 using a suitable connection 70*f*.

In one embodiment, some of the input devices 70*a*–70*f* may be controlled by the apparatus 20, rather than independent device controls. For example, one or more camera control buttons or other interfaces may be provided on the apparatus and coupled, though the apparatus, to the camera to allow a user to operate and maneuver the camera 70*d*. Camera control may be made via a Motion Control Card (MCC) 97 that is hardwired to the camera 70*d* or otherwise communicates with the camera 70*d* via a wireless communication. Camera maneuvering may be made using any of the foregoing input devices that may communicate with the MCC. Control and/or maneuvering of the camera includes at least focusing, zooming, change viewing axis, etc., as the present invention is not limited in this respect. Control of the camera can occur because, in one embodiment, the camera includes a stepper motor coupled to various components of the camera, e.g., a gimbal for moving the camera head. The MCC can control the stepper motor as desired. Alternatively, the camera 70*d* may be manipulated by hand, as the present invention is not limited in this respect. Further, a white balance control button 77, intended to compensate for the amount of ambient light coming into the camera 70*d*, may be employed. Control button 77 is internally connected to the CCU.

In one embodiment, the apparatus 20 has at least one output device used to display and/or store images and data. In one embodiment, an LCD (Liquid Crystal Display) screen 80*a* is coupled internally to the motherboard 90 and is visible to the user through a cut-out in the casing 130. An LCD back light inverter 82 may be employed to control the illumination of the screen 80*a*. In one embodiment, the LCD 80*a* works in conjunction with the aforementioned touch screen 70*a* to act as both an input and an output device. Of course, the LCD is one example of a display and other suitable displays can be used.

Figure 5:
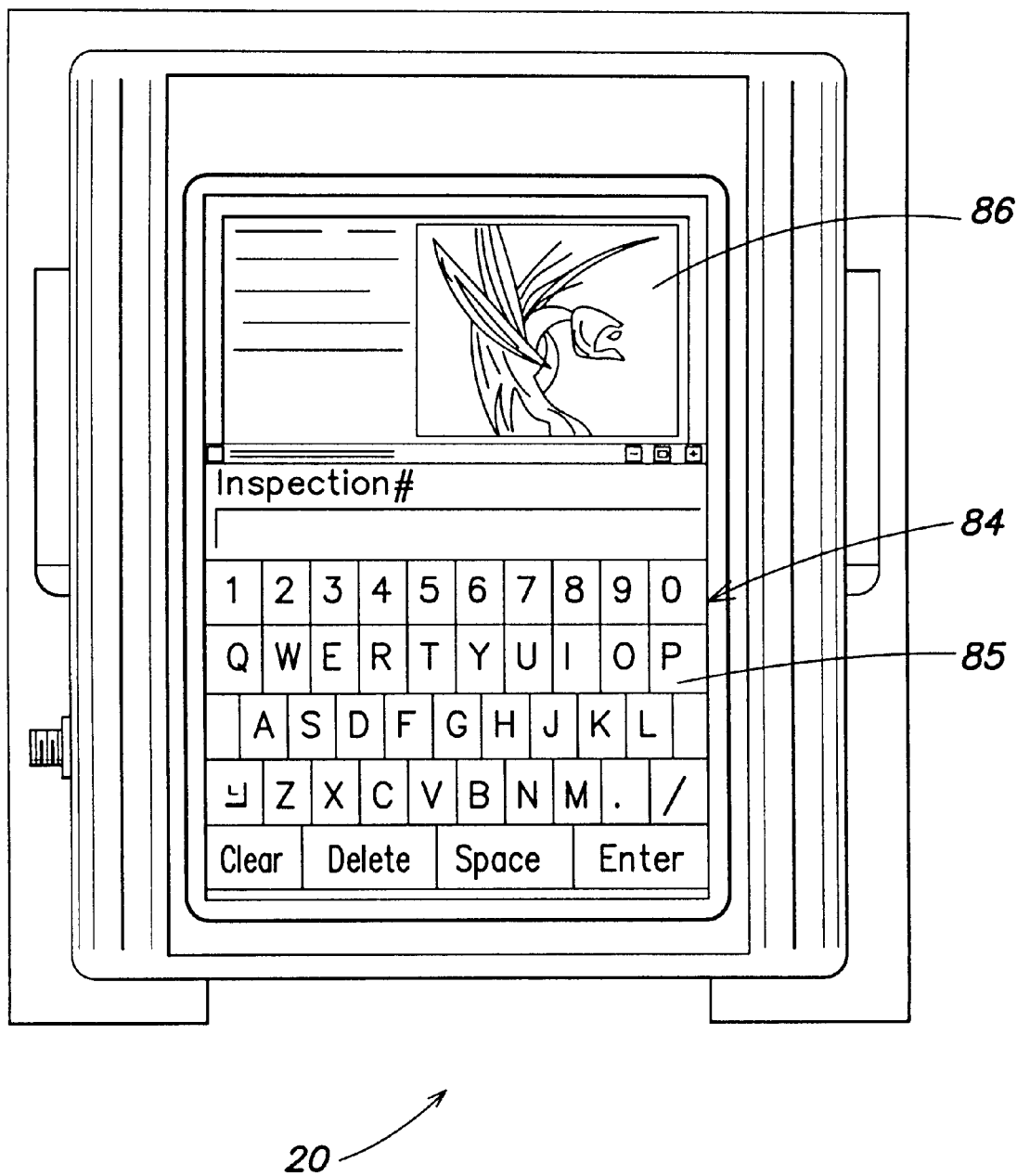
FIG. 5 is a view of the maintenance apparatus of FIG. 3 showing an example of a display provided by the maintenance apparatus.

This LCD 80*a* may be configured to display image data, video data and text data in any number of display patterns 84, as shown in FIG. 5. In one embodiment, the display 84 includes a split screen comprising an image of keys, such as a typical keyboard setup 85, enabling a user to type on the touch screen 80*a* using his or her fingers or other such probe, and an image display region 86 for displaying the imaged component with related text, if included. In one embodiment, the orientation (landscape or portrait) of images in region 86 can be manipulated, as will be discussed below. These images may be still or streaming video, as the present invention is not limited to any particular convention. In another embodiment, although not shown, the image display region may also include a split screen, wherein images and text data from two or more cameras, each viewing a component, may be displayed. Alternatively, the split screen may display stored or historical images and/or text of one or more components as well as real time data. The split screen may also be used to display any of the other aforementioned data. Additional electronic hardware and software may be necessary to view images in a split screen mode.

An external monitor or television (not shown) may also be attached to the apparatus 20 and configured as a display in any of the manners disclosed above. In one embodiment, the external monitor is connected to the apparatus 20 via a hardwire connection to a VGA (Video Graphics Array) port 87. VGA is one of several standards for color monitors. However, it is to be appreciated that other techniques for outputting video may be employed, as the present invention is not limited in this respect. In one embodiment, a television is connected to the apparatus 20 via a hardwire connection to the aforementioned S-video port.

Additionally, many of the external communication mediums provided as input devices may also be used as output devices. For example, in one embodiment, data output is made through the communication medium 70*c*, such as a modem, Ethernet or wireless devices. Data may also be outputted to memory, including the aforementioned flashcard 70*b*, the motherboard's internal memory, or any other memory device known to those in the art, internal or external to the apparatus 20, such as the aforementioned magnetic media, optical media, or electronic media.

In one embodiment, a speaker 80*b* may optionally be coupled to the apparatus 20 or otherwise included therein for presenting audio picked up by the microphone 70*e*, whether real-time or previously stored, regarding the object being inspected as well as previously recorded or real time voice transmission. It is to be appreciated, however, that the use of audio data and the speaker are not required for all embodiments.

The motherboard 90 controls data flowing in and out of the device and internal device activity. The motherboard contains the CPU 92, memory, buses, and I/O connection sockets. The CPU can be any suitable processor (e.g., such as a Mobile P3, available from the Intel Corporation, Santa Clara, Calif.). The motherboard 90 can be custom designed, or can be any of numerous commercially available motherboards. One such motherboard 90 that may be employed is the Microbus MPX-233111, manufactured by Microbus Inc. of Houston, Tex. The Microbus MPX-233111 contains a video chip 110 coupled to the motherboard 90 through a COM (serial communications) port. This motherboard may be used with a Philips 69000 video chip, manufactured by Philips Semiconductors of Eindhoven, The Netherlands, as the video chip 110. Any other suitable video chip may be employed. In one embodiment, the CCU 100 is also coupled to the motherboard 90 and is used to control and receive images from one or more of the external cameras 70d described above. One example of a CCU 100 that may be used is the Panasonic GP-KS162CBPWNTCE manufactured by the Panasonic Systems Company of Elgin, Ill. Both the video chip 110 and the CCU 100 aid in manipulating and displaying graphics data. It should be appreciated that the name brand and type of components described are exemplary, as the present invention is not limited in this respect.

Most incoming data flows through the motherboard 90 upon entering the apparatus 20. Input data received via the camera 70d may be received by the CCU 100 before being processed by the motherboard 90. The CCU 100 is capable of controlling one or more parameters of camera generated images including gain and white light balance and controlling an electronic iris for contrast. In one embodiment, the aforementioned white balance control button 77 is connected to the CCU 100 so that an initial white balance reading may be obtained. To take such a reading, the user places a piece of white paper in front of the camera 70d and depresses the white balance control button 77. The CCU 100 uses this reading to measure the amount of ambient light. Then, the CCU 100 uses the reading to adjust the color data in all subsequent camera shots, compensating for the ambient light.

The CCU can also perform analog to digital (A/D) conversion. For example, the CCU may receive images in any electronic format from the camera and reformat the images into digital format. The CCU then passes the digitally formatted image to the CPU.

The video chip 110 can perform a variety of image manipulations on any image, and is not limited to manipulating solely camera generated images. In some embodiments, the video chip 110 is capable of A/D conversion, as well as formatting the image into known image formats, such as JPEG (Joint Photographic Experts Group). Once formatted by either or both of the CCU 100 and the video chip 110, the data may be passed to the CPU 92 for further processing, storing and/or transmitting.

The CPU 92 retrieves any requested data and sends it to the proper output device as requested. The CPU 92 also processes, stores or sends any inputted data as directed. Software used in the apparatus 20 may be run by and controlled by the CPU 92. Such software may be custom software or commercially available software, such as XFREE86 provided by The XFree86 Project, Inc (available from the University of Sydney, Australia) that runs on UNIX® and compatible (e.g., Linux, BSD, Mac OS X and Solaris x86 series) operating systems and OS/2 and a suitable windows manager. This or other software may be used so that the CPU can perform concurrent operations of two or more processes in a multitask fashion. In one embodiment, Linux operating system is run on the apparatus, available from Linux.com. Other suitable operating systems may be employed as the present invention is not limited in this respect.

Word processing or other text processing software may be employed to handle partial or full text inputs by a user. In this respect, any text information that a user desires may be inputted, not merely pre-programmed information. Of course, pre-programmed information, such as checklists, may also be employed. The images or audio data may be attached as a file to the text resulting text file.

Additional software may include an image manipulation package, enabling the data to be formatted according to certain display constraints. Some possible manipulations may include image rotation, image sizing and choosing between landscape and portrait display options. The CPU 92 may employ any of a number of algorithms to handle these tasks, as will be explained below. In one embodiment, the memory 94 is used to buffer several frames of incoming streaming video such that the images can be processed frame by frame and then displayed to the user at a rate comparable to that of real time, but several microseconds later. This process improves display quality and facilitates image manipulation. For example, each frame in the buffer may be rotated prior to being displayed to the user.

The CPU 92 can interface with the motherboard's memory 94 in any of numerous ways, e.g., through various busses. In one embodiment, the motherboard 90 contains 64 MB of RAM (Random Access Memory). However, the present invention is not limited by the type or amount of storage placed on the motherboard 90, as additional types or amounts may be coupled to the motherboard 90. In the embodiment shown, both the memory 94 and the CPU 92 interface with the I/O devices through the I/O connection.

In one embodiment, a power supply interface is provided by a port 112 capable of hardwire connection to an external power supply. The power supply level may be about 12 V, or other levels may be employed. The apparatus 20 can include an on-board power source, such as a battery 114 (FIG. 4), which may be rechargeable and housed within the casing, thereby rendering the apparatus 20 cordless.

As discussed above, the various components forming the apparatus 20 may be housed within a casing 130. In one embodiment, the casing 130 includes a front casing 130a and a back casing 130b that interconnect to form an enclosure. The front casing 130a contains a cutout 132 for the display screen 80a and touch screen 70a. The back casing 130b is substantially rectangular and may also one or more cutouts 134 for ports to external devices and/or control buttons, knobs, switches or other interfaces.

The front and back casings 130a, 130b may be secured together using any suitable technique, such as with the use of screws. In addition, the casing 130 may contain various bosses to support and secure the various electronic and mechanical components of the apparatus 20.

In one embodiment, the casing 130 also contains two sets of four curved finger grooves 136 on the external side to aid in handling the apparatus 20. Handles 138 are attached to the casing 130 over these groves, leaving about a one to two inch space for a user's hands. A hook 140 may be mounted to the case to allow the apparatus 20 to be hung for hands-free use. It should also be recognized that casing for the apparatus 20 can take many other shapes and configurations, as not limited. The casing 130 of the apparatus 20 may be manufactured out of many types of material in order to satisfy the needs of the user. For example, the apparatus 20 may be ruggedized and/or waterproofed.

In addition, it should be appreciated that various aspects of the present invention are not limited to the use of this or any particular hardware particularly adapted for use as a digital maintenance apparatus. For example, many of the above-described methods may be programmed into any suitable computer.

As discussed above, any suitable type of imaging unit or camera can be used with the apparatus 20 to provide images of the object 24. One example of an imaging system, including a camera assembly and a scope, with which the apparatus 20 of the present invention can be used, will now be described with reference to FIGS. 6–10. However, it is to be appreciated that the apparatus 20 is not limited to use with this or any other particular imaging system.

Figure 6:
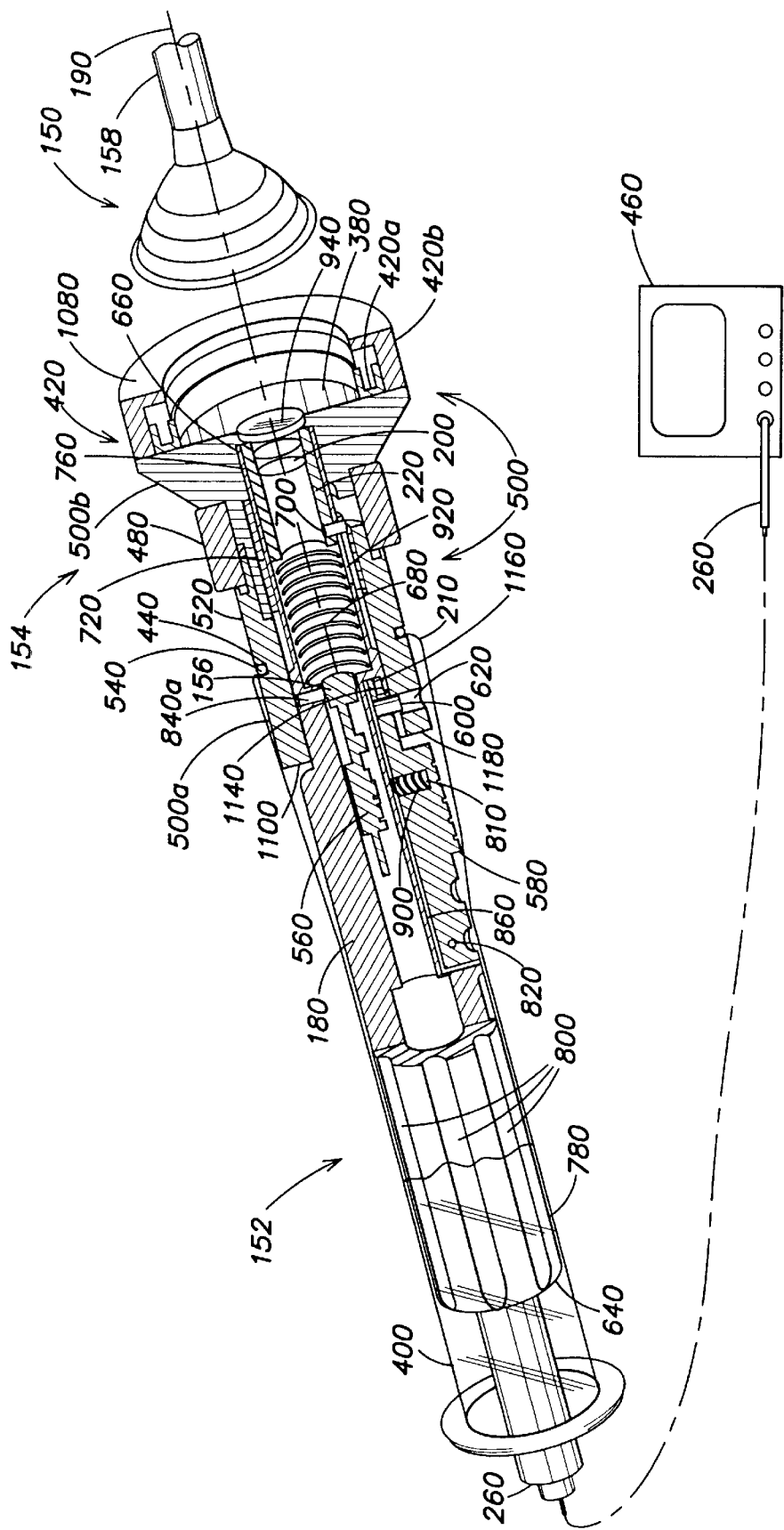
FIG. 6 is a partially cut away perspective view of an imaging system for use with the maintenance apparatus of FIGS. 3–5.

FIG. 6 is a partially cut away perspective view of an example of an imaging system that may be used with the apparatus 20. As shown, the imaging system includes four primary components, i.e., a scope 150, such as an endoscope, an imaging unit or camera assembly 152, a coupler 154, which couples the scope 150 to the imaging unit 152, and a condom-like drape 400, which prevents the imaging unit 152 from contaminating a sterile operating field should the system be used in a medical environment, a clean room environment for the manufacture of e.g., silicon wafers, or other sterile environments. The use of the condom-like drape 400 need not be employed when inspecting components, such as aircraft engines. The imaging system can be employed with any type of image-producing scope, and is not limited to use with any particular type of scope.

As discussed in more detail below, in the exemplary imaging system shown in FIGS. 6–7, the condom-like drape 400 does not intercept the optical viewing axis of the system. In addition, the condom-like drape 400 does not cover a focusing mechanism 480 of the imaging system, making it easier to focus the system and lessening the likelihood that the drape 400 will be damaged due to manipulation of the focusing mechanism.

The lens for focusing the image from the endoscope to the imaging unit may be provided in the imaging unit 152, rather than in the coupler 154. This is particularly advantageous because, as discussed in more detail below, in the exemplary embodiment shown, a portion of the coupler 154 is not separated from the scope 150 by the condom-like drape 400, and therefore, is sterile in use. By removing the refractive lens 200 from the coupler 154, the coupler 154 can be made significantly less expensively, thereby enabling the coupler 154 to be provided as a disposable part that need not be sterilized between uses. This is advantageous because the sterilization of the devices can be inconvenient and time consuming.

The imaging unit 152 includes an image sensor 156 that senses an image along an imaging axis (not shown). When the imaging system is used, the coupler 154 is coupled between the eyepiece 158 of the scope 150 and a distal end 660 of the imaging unit 152 such that the lens 200 is disposed between the image sensor 156 and the eyepiece 158 to focus an image produced by the scope 150 onto the image sensor 156. The refractive lens 200 may be provided in the imaging unit 152, rather than in the coupler 154. The coupler can be therefore made significantly less expensively, thereby enabling the coupler to be provided as a disposable part that need not be sterilized between uses.

The image sensor 156 may, for example, include a charge-coupled device (CCD) as discussed above, or a metal-oxide semiconductor (MOS) sensor. It should be appreciated, however, that the present invention is not limited in this respect, and can be employed with any type of image sensor 156. The image generated by the image sensor 156 can be conveyed to the maintenance apparatus 20 or a monitor 460 in any of numerous ways, and the present invention is not limited to any particular implementation. For example, the image sensor 156 may be coupled to circuitry 560 which can assist in converting an image sensed by the image sensor 156 into an electrical signal. This electrical signal then may be transmitted (e.g., via cable 260) to the monitor 460, maintenance apparatus 20 or elsewhere for display to a user or may be otherwise processed and/or recorded on a suitable medium. Alternatively, the image sensor 156 may comprise a bundle of fiber optic cables which optically transmit an image from the lens 200 to the apparatus 20 or other a viewing device for display to a user. Thus, the image sensor 156 need not necessarily convert the image from scope 150 into an electrical signal.

The imaging unit 152 is releasably mated with the coupler 154. This mating may be accomplished using any of a number of techniques. FIGS. 6 and 7 illustrate one technique that may be used to mate these two components. In the particular implementation shown, to mate imaging unit 152 with coupler 154, a distal end 660 of the imaging unit 152 is inserted into an opening 880 at a proximal end 1100 of the coupler 154. As shown, the imaging unit 152 includes a button 580 which is pivotally connected, via a pin 820, to a body portion 180 of the imaging unit 152. The imaging unit 152 has a cavity 810 formed underneath the button 580 and a spring 900, disposed in the cavity 810. Spring 900 biases the button 580 (in a clockwise direction in FIG. 6) about pin 820 so that locking member 600 is biased away from a surface 860 of body portion 180. When a user pushes button 580 toward surface 860, however, spring 900 is compressed so that button 580 moves in a counterclockwise direction in FIG. 6 about pin 820 and locking member 600 moves toward surface 860. Thus, when the button 580 is depressed and the distal end 660 of the imaging unit is inserted into the opening 880 in the coupler 154, the locking member 600 moves toward surface 860 so that it can slide over edge 1180 of the coupler 154. When the button 580 is released, the locking member 600 is biased (by spring 900) away from surface 860 and into a notch 620 in the coupler 154, and a shoulder 1160 of imaging unit 152 contacts a shoulder 1140 of the coupler 154, thereby interlocking the imaging unit 152 and the coupler 154. An indication that the distal end 660 of the imaging unit 152 is fully inserted into the opening 880 is provided by the distal end 660 contacting a shoulder 1120 of coupler 154. The imaging unit 152 and coupler 154 can be separated by pushing button 580, which moves the locking member 600 out of the notch 620, and pulling the imaging unit 152 away from the coupler 154. As mentioned above, FIGS. 6 and 7 illustrate only one example of the many ways that the imaging unit 152 and coupler 154 may be mated together.

Figure 7:
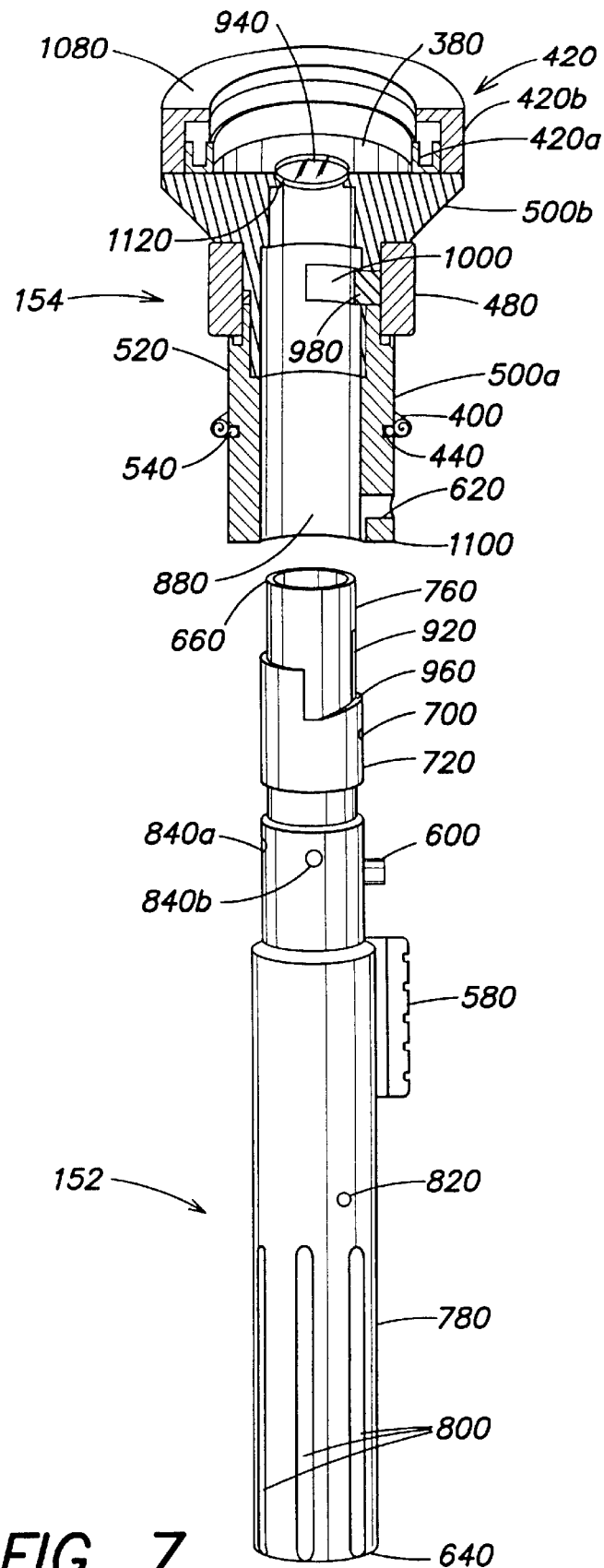
FIG. 7 is a partially cut away perspective view of the imaging system shown in FIG. 6.

As shown in FIGS. 6 and 7, the imaging unit 152 also includes a handle 780 proximal to the body portion 180. The handle 780 may include grooves 800 to make it easier for a user to grip the imaging unit 152 though the drape 400 that can be extended over the imaging unit 152 in a manner described below.

The image sensor 156 and circuitry 560 may be mounted in the body portion 180 of the imaging unit 152 in any of a number of ways. For example, the image sensor 156 may be mounted via pins or screws 840*a* and 840*b*, and circuitry 560 may be mounted on a circuit board supported within body portion 180. One or more wires (not shown) may be used to interconnect the circuitry 560 with the cable 260.

It may be useful to enable the focal length between the image sensor 156 and the lens 200 of imaging unit 152 to be adjusted. In the system shown in FIGS. 6–7, this is accomplished via a mechanism that is not covered by the condom-like drape 400, thereby making it easier to focus the system and lessening the likelihood that the drape 400 will be damaged due to manipulation of the focusing mechanism. It should be appreciated, however, that the focal length adjustment can be accomplished in any number of ways.

One example of a technique that is useful to perform the focal length adjustment is illustrated in FIGS. 6–8. In the embodiment shown, the refractive lens 200 is disposed in the imaging unit 152, rather than in the coupler 154. Thus, the focusing mechanism includes elements disposed in the imaging unit 152, as well as in the coupler 154. As mentioned above, placement of the lens 200 within the imaging unit 152, rather than in the coupler 154, provides at least one significant advantage. That is, the cost of the coupler 154 may be reduced significantly below the cost of coupling devices that include lenses, thereby making it commercially practicable to use a new, sterile coupler each time the imaging system is used, rather than repeatedly sterilizing and reusing the same coupling device should sterilization be required.

The distal end 660 of the imaging unit 152 includes a primary cylinder 760, in which a spring 680 and a cylindrical lens holder 220 are disposed. Lens holder 220 supports the lens 200 in front of an imaging axis of image sensor 156. Lens holder 220 (and lens 200) can be moved within primary cylinder 760 either toward or away from to distal end 660 of the imaging unit 152 so as to adjust the focal length between the image sensor 156 and the lens 200. Spring 680 biases lens holder 220 toward distal end 660. The position of lens holder 220 within primary cylinder 760 can be adjusted, however, through manipulation of a focusing mechanism on the coupler 154 as discussed below. It should be appreciated that the present intention is not limited in this respect and that a camera including a lens that does not require focussing may be employed.

The imaging unit 152 further includes an outer cylinder 720, including a spirally ramped upper edge 960, which surrounds the primary cylinder 760. Outer cylinder 720 is movable with respect to primary cylinder 760 either toward or away from the distal end 660 of imaging unit 152. Outer cylinder 720 is connected to the lens holder 220 via a pin 700. Pin 700 extends through a slot 920 which extends a short distance along a length of the primary cylinder 760. Thus, lens holder 220, outer cylinder 720 and pin 700 move as a single unit, with respect to primary cylinder 760, either toward or away from the distal end 660 of imaging unit 152. The manner in which this unit interacts with the focusing mechanism disposed on coupler 154 is described below in connection with FIGS. 8*a*–8*b*.

FIGS. 6 and 7 show an exemplary implementation of the coupler 154. The coupler 154 can be constructed in any of a number of ways to achieve the desired goal of enabling the imaging unit 152 to be coupled to the scope 150. In the implementation shown, the coupler 154 includes a main body 500 (including a proximal portion 500*a* and a distal portion 500*b*), a focusing ring 480, a light-penetrable window 940, a scope mounting portion 420 (including inner ring 420*a* and outer ring 420*b*) and the condom-like drape 400.

The components constituting the main body 500, focusing ring 480 and scope-mounting portion 420 may be made of any suitable material and may be affixed together in any suitable manner. For example, they may be plastic molded components affixed together using an epoxy-based adhesive. When the coupler 154 is a disposable device, the coupler 154 is preferably formed from inexpensive components.

The main body 500 may be formed by inserting the distal portion 500*b* within the focusing ring 480, and then affixing together the proximal and distal portions 500*a* and 500*b*. Scope mounting portion 420 may be affixed to distal portion 500*b*. Main body 500 has an outer surface 520 between a distal end 1080 and a proximal end 1100 of the coupler 154. A channel 440 extends about a perimeter of the outer surface 520 between the focusing ring 480 and the proximal end 1100.

When the coupler 154 is used in a medical or clean room application, it is desirable to not have to sterilize the imaging unit 152, thereby saving the time and expense of sterilization, and avoiding restrictions on the manner in which the imaging unit be formed, since it need not be sterilizable. Therefore, a sterile barrier may be established between the sterile operating environment including the scope 150, and a non-sterile environment including the imaging unit 152. In the system shown in FIGS. 6–7, such a sterile barrier is established by coupling the distal end 660 of the imaging unit 152 to the coupler 154, and providing a hermetic seal between the components of the coupler 120 that separate the sterile and non-sterile environments. A light-penetrable window 940 is hermetically sealed between the distal end 1080 and the proximal end 1100 of the coupler 154 to establish a sterile barrier therebetween. Window 940 may be made of glass, plastic, or any other suitable material through which light can pass from the scope 150 to the image sensor 1 56 (via lens 200) to generate a suitable image.

As mentioned above, the coupler 154 also includes the condom-like drape 400. The condom-like drape 400 may be made of any material that is suitable for creating a sterile barrier between a sterile environment and a non-sterile environment. For example, the condom-like drape may be made of a non-porous latex or plastic material. When the imaging unit 152 is mated with the coupler 154, the drape 400 may be extended to cover some or all of imaging unit 152 and cable 260. The condom-like drape 400 may be hermetically sealed to the outer surface 520 of coupler 154. It should be appreciated that in the implementation shown in the figures, when each of the components of the coupler 154 is sterile, the hermetic seals between the main body portion 500 and the window 940 and drape 400 establish a sterile barrier between the scope 150 and the imaging unit 152, with the main body portion 500 of the coupler 154 itself forming a part of this sterile barrier. As compared to other systems, in which a sterile barrier is formed only with a drape and a window portion thereof and in which a coupling device is located entirely on the non-sterile side of this barrier, the system shown in FIGS. 8 and 9 is superior because scope 150 can mate directly with body portion 500 rather than requiring the drape to be interposed between the coupling device and the endoscope.

In the system shown in the figures, the condom-like drape 400 does not intercept the optical viewing axis 190 of the imaging system. As mentioned above, this is advantageous in that the drape 400 need not be provided with a window that must be aligned with the optical viewing axis 190, and the drape 400 does not interfere with the quality of the image presented on the monitor 460. It should be appreciated that the function performed by the condom-like drape 400 can be achieved in any of numerous ways. For example, a protective drape can be provided that is more rigid than the condom-like drape 400 depicted in the drawings.

In the system shown in the drawings, the condom-like drape 400 is substantially tubular in form and is open on its distal and proximal ends. The distal end 210 of the condom-like drape 400 is attached to the outer surface 520 (within channel 440) of the coupler 120. As discussed above, this attachment can be accomplished using a hermetic seal (e.g., via an O-ring 540) to maintain the separation between the sterile and non-sterile environments. The condom-like drape 400 can be provided in a rolled-up form attached to the coupler 154. After the coupler 154 is mated with to the imaging unit 152 as described above, the condom-like drape 400 can be unrolled to cover the non-sterile imaging unit 152. By encompassing the outer surface 520 of coupler 154 with the opening at the distal end 210 of the drape 400, the drape 400 can be used in conjunction with coupler 154 without requiring the user to align the drape 400, or a window portion thereof between the eyepiece 158 of the scope 150 and the coupler 154, and without having the drape 400 intercept the optical viewing axis 190 of the imaging system. As discussed above, it is to be appreciated that the use of a drape is optional.

FIGS. 6 and 7 illustrate one example of a technique that may be used to mate the scope 150 with the coupler 154. It should be appreciated that numerous other suitable mating techniques can be employed. In the system shown in FIGS. 6 and 7, the scope 150 is mated with the coupler 154 by inserting the eyepiece 158 into an opening 380 at the distal end 1080 of the coupler 154. Opening 380 may be formed by the inner and outer rings 420a–420b of the scope mounting portion 420. The inner and outer rings 420a–420b form equal diameter openings, and inner ring 420a is movable with respect to outer ring 420b. A spring biases the inner ring 420a so that its center is forced to be offset from the center of the outer ring 420b unless a user activates a lever (not shown) to cause the centers of the two rings to align with one another.

To mate the scope 150 with the coupler 154, the user activates the lever so that the centers of the rings 420a–420b align with one another and inserts the eyepiece 158 through both rings. The user then can release the lever so that the spring (not shown) causes the center of ring 420a to become offset from the center of ring 420b. Because the diameter of the eyepiece 158 is only slightly smaller than the diameter of each of rings 420a and 420b, when the centers of the rings are offset from one another, the eyepiece 158 will be locked within the scope mounting portion 420 of the coupler 154. The eyepiece 158 may be separated from the scope mounting portion 420 by pressing the lever to realign the centers of rings 420a and 420b and pulling the scope 150 away from the coupler 154.

In the system of FIG. 6, the coupler 154 is shown as being mated directly with the eyepiece 158 of the scope 150. However, it should be appreciated that the scope 150 (or other image-producing scope) may alternatively be mated indirectly with the coupler 154. For example, the scope 150 may be mated with the coupler 154 via one or more additional coupling devices.

As discussed above, using the system of FIGS. 6–8, the user can directly manipulate a focusing mechanism without having to do so through a portion of a protective drape such as condom-like drape 400. Any focusing mechanism can be employed that serves to adjust the focal length between the lens 200 and image sensor 156 in the imaging unit 152. In the exemplary system shown in FIGS. 6–8, a focusing ring 480 is provided on the coupler 154 to perform this focal length adjustment. The focusing ring 480 is disposed distally of the distal end 210 of the condom-like drape 400, so that after the drape 400 is extended to cover some or all of the imaging unit 152 and cable 260, the focusing ring 480 is not covered by the drape 400 and may be manipulated by a user to adjust the focal length between the lens 200 and the image sensor 158 without also having to manipulate the drape 400. Hence, this feature makes focusing ring 480 relatively easy for the user to manipulate to achieve sharp focusing, and reduces the risk of damage to drape 400.

Figure 8A:
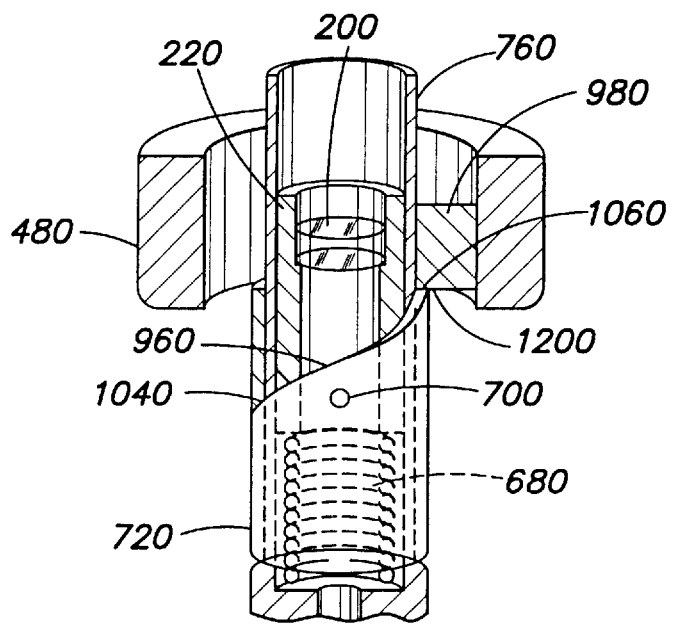
FIGS. 8a and 8b are partially cut away perspective views of an illustrative focusing mechanism employed in the system of FIGS. 6–7.
Figure 8B:
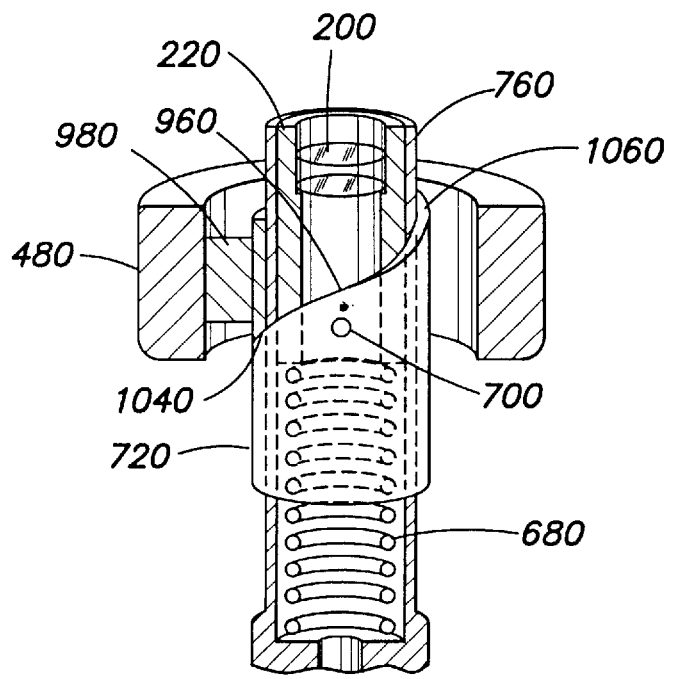
Figure 9:
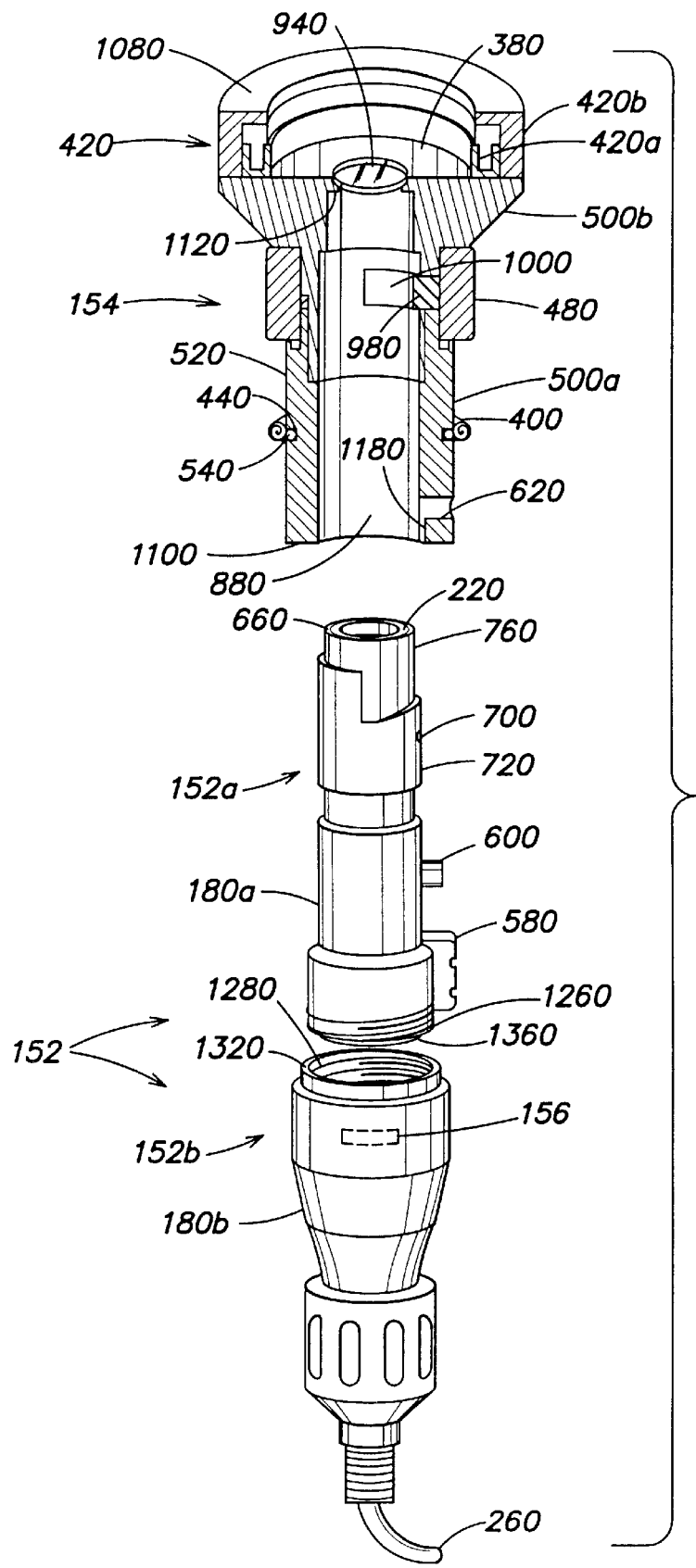
FIG. 9 is a partially cut away perspective view of an alternative embodiment of the imaging system including an adapter that adapts a standard camera head to be mated with a coupler shown in the system of FIGS. 6–7.

An illustrative example of a linkage assembly for mechanically coupling the focusing ring 480 on the coupler 154 to the imaging unit 152 to adjust the focal length between the lens 200 and image sensor 158 is shown in FIGS. 7, 8a and 8b. It should be appreciated that numerous other implementations are possible. In the system shown, the distal portion 500b of the main body portion 500 of coupler 154 has an annular groove 1000. Annular groove 1000 may be covered by the focusing ring 480, so that it is not visible from the outside of coupler 154. A finger 980 extends inwardly from the focusing ring 480 through the annular groove 1000, so that when the focusing ring 480 is rotated about the main body portion 500, finger 980 slides within the annular groove 1000.

As shown in FIGS. 8a and 8b, when the imaging unit 152 is mated with the coupler 154, a lower surface 1200 of finger 980 contacts a portion of a spiraling ramp surface 960 on the outer cylinder 720. As mentioned above, pin 700 may be connected between the outer cylinder 720 and the cylindrical lens holder 220 through the slot 920, which extends along the length of the primary cylinder 760, so that the outer cylinder 720 and lens holder 220 do not rotate with respect to the primary cylinder 760. The focusing ring 480, however, can rotate freely about the primary cylinder 760, limited only by the movement of the finger 980 within the annular groove 1000.

As the focusing ring 480 rotates with respect to the primary cylinder 760, a bottom surface 1200 of the finger 980 slides along the spiraling ramped surface 960. The spring 680 pushes upwardly on outer cylinder 720 to keep a portion of the spiraling ramped upper surface 960 in contact with bottom surface 1200 of the finger 980 at all times. Enough friction exists between the focusing ring 480 and the main body 500 of the coupler 154 to prevent the spring 680 from rotating the focusing ring 480 when it is not being manipulated by a user. This friction makes the fine tuning of the focal length between the lens 200 and image sensor 156 (using focusing ring 480) relatively easy to accomplish.

FIGS. 8a and 8b illustrate the focusing mechanism at its two extreme focusing positions, with FIG. 8a illustrating the lens 200 at its closest position to the image sensor 156 and FIG. 8b illustrating the lens 200 at its furthest position from the image sensor 156. As shown in FIG. 8a, when the lens 200 is at its closest position to the image sensor 156, the spring 680 is fully compressed, bottom surface 1200 of finger 980 is in contact with a point 1060 near the top of the spiraling ramped surface 960, and the finger 980 is in a first position with respect to the primary cylinder 760. In contrast, as shown in FIG. 8b, when the lens 200 is at its furthest position from the image sensor 156, the spring 680 is fully extended, the bottom surface 1200 of finger 980 is in contact with a point 1040 near the bottom of the spiraling ramped surface 960, and the finger 980 is in a second position with respect to the primary cylinder 760, which is on an opposite side from the first position (FIG. 8a).

It should be appreciated that the above-described system for adjusting the focal length between the image sensor 156 and the lens 200 is only one example of the many possible systems that can achieve this result, as other implementations can alternatively be employed.

Figure 10:
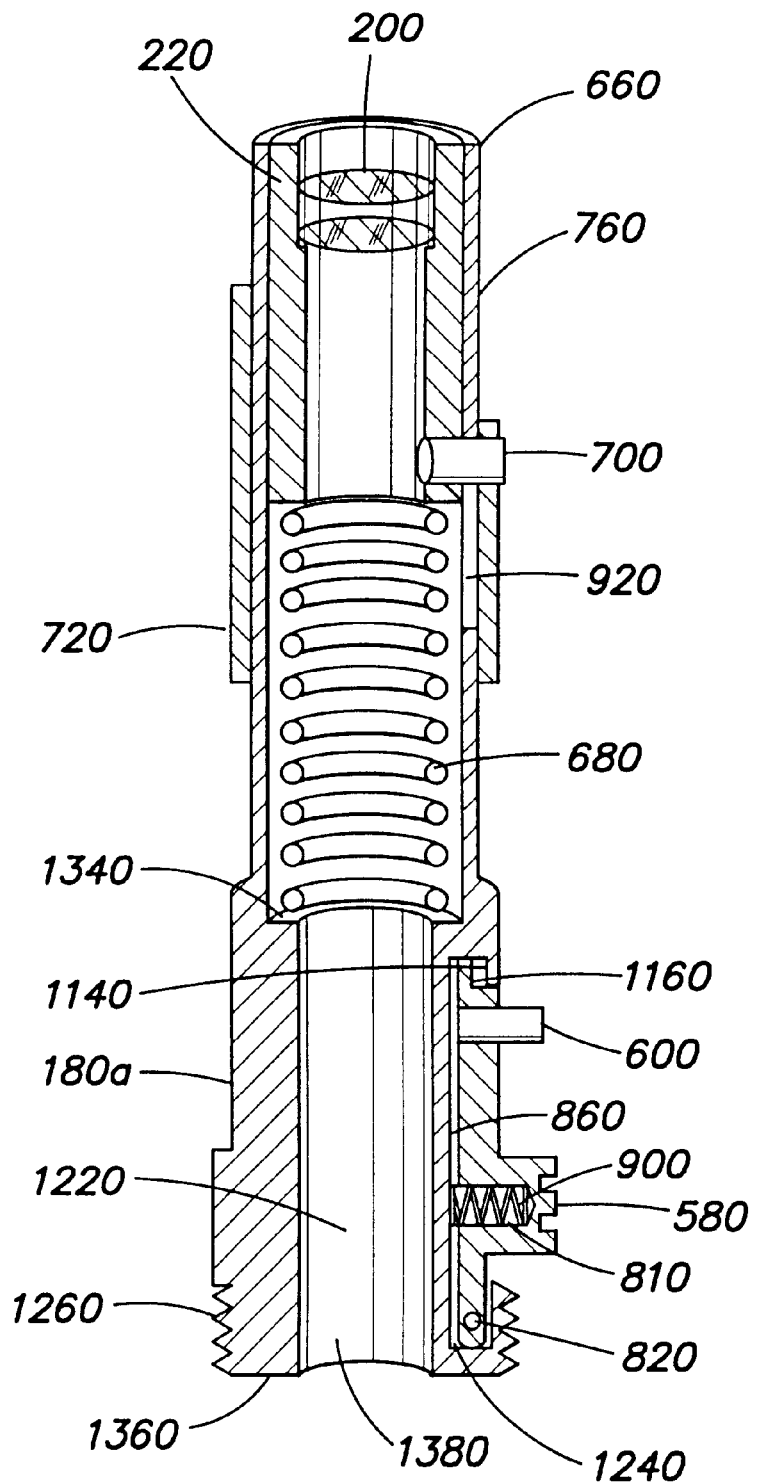
FIG. 10 is a partially cut away perspective view of the adapter shown in FIG. 9.

In the illustrative embodiment of FIGS. 6–7, the imaging unit 152 includes a single body portion 180 in which both the image sensor 156 (and associated circuitry 560) and the refractive lens 200 (and associated components such as the lens holder 220, the spring 680, and the cylinders 720 and 760) are disposed. It should be appreciated, however, that various components of the imaging unit 152 may alternatively be distributed among two or more separate housings that may be mated together to form the imaging unit 152. An illustrative example of an imaging system configured in this manner is shown in FIGS. 9 and 10. As shown in FIG. 9, the imaging unit 152 to be mated with the coupler 154 may include a first housing 180*a* in which the refractive lens (and associated components) is disposed, and a second housing 180*b* in which the image sensor 140 (and associated circuitry (not shown)) is disposed.

In the illustrative embodiment shown in FIGS. 9 and 10, the second housing 180*b* is the housing of a camera head 152*b* (e.g., a standard C-mount camera head), and the first housing 180*a* is the housing of an adapter 152*a* for adapting the camera head 152*b* for use with the coupler 154. When the adapter 152*a* is mated with the camera head 152*b* (as discussed below), the adapter 152*a* and the camera head 152*b* together form a composite imaging unit 152 which is similar to the imaging unit 152 described above in connection with FIGS. 6–7. Although the example shown in FIGS. 9–10 includes a C-mount camera head and adapter therefor, it should be appreciated that each of the housings 180*a*–180*b* may take on any of a number of alternative forms. For example, the housing 180*b* may alternatively be the housing of a standard V-mount camera head, or any other device in which an image sensor is disposed, and the housing 180*a*, may be configured to be mated with the same.

It should also be appreciated that the imaging unit 152 may further include additional housings, including only one or two housings. For example, referring to the FIG. 9 system, the imaging unit 152 may further include one or more housings disposed between the housings 180*a* and 180*b* or between the housing 180*a* and the coupler 154. Such an additional housing may exist, for example, in the form of a coupling device that couples together the housings 180*a* and 180*b* or the housing 180*a* and the coupler 154. It should be appreciated that the imaging unit actually employed may be any of numerous devices or combinations of devices capable of receiving an optical image along an imaging axis. As used herein, the term "imaging unit" is not intended to be limiting. Rather, it is intended to refer to any device or combination of devices capable of performing an imaging function.

Further, while in the systems of FIGS. 6–9 the coupler 154 is shown as being mated directly with the distal end 660 of the imaging unit 152, it should be appreciated that the imaging unit 152 may alternatively be mated indirectly with the coupler 154. For example, the imaging unit 152, in whatever form, may be mated with the coupler 154 via one or more additional coupling devices.

In the illustrative system shown in FIGS. 9–10, the operational interface between the adapter 152*a* and the coupler 154 is identical in most respects to the operational interface between the imaging unit 152 and the coupler 154 described above in connection with FIGS. 6–8. Corresponding components in the two embodiments have therefore been labeled with identical reference numerals, and reference may be made to the description of the embodiment of FIGS. 6–8 for an in-depth understanding of the operational interface between the adapter 152*a* and the coupler 154 of the embodiment of FIGS. 9–10.

As mentioned above, the camera head 152*b* may, for example, be a standard C-mount camera head. Therefore, as shown in FIG. 9, the camera head 152*b* may include a threaded, female connector 1280 formed at a distal end 1320 thereof. To permit the adapter 152*a* to mate with the connector 1280 of the camera head 152*b*, the adapter 152*a* may include a threaded, male connector 1260 formed at a proximal end 1360 thereof.

As shown in FIG. 9, the image sensor 156 may be disposed adjacent the distal end 1320 of the camera head 152*b* so that, when the male connector 1260 of the adapter 152*a* is threaded into the female connector 1280 of the camera head 152*b*, the image sensor 156 is disposed adjacent an opening 1380 at the proximal end 1360 of the adapter 152*a*. In the system of FIGS. 9–10, the image sensor 156 is therefore disposed further from the distal end 660 of the imaging unit 152 than it is in the system of FIGS. 6–7. For this reason, in the system of FIGS. 9–10, an annular cavity 1220 is formed within the housing 180*a* to provide an optical pathway between the refractive lens 200 and the image sensor 156 along which an image produced by the scope 150 can be focused onto the image sensor 156 via the lens 200. The cavity 1220 may be formed, for example, by reducing a width of an annular shoulder 1340 (FIG. 10) supporting one end of the spring 680 to be narrower than in the embodiment of FIGS. 6–7.

In addition, in the system of FIGS. 9–10, the button 580 is disposed on the adapter 152*a* of the imaging unit 152, and is therefore disposed distally of the image sensor 156 in this system, rather than proximally of the image sensor 156 as in the system of FIGS. 6–7. As shown, to make the button 580 fit on the adapter 152*a*, the button 580 may be shortened as compared to the system of FIGS. 6–7. Additionally, the pin 820 about which the button 580 pivots may be disposed within a small cavity 1240 adjacent the proximal end 1360 of the adapter 152*a*, rather than being disposed proximally of the image sensor 156 as in the system of FIGS. 6–7. It should be appreciated, of course, that the button 580 and locking member 600 represent only one example of numerous mechanisms that can be used to interconnect the imaging unit 152 with the coupler 154, and that the imaging unit 152 may be mated with the coupler 154 in different ways. For example, the imaging unit 152 may not include a button such as the button 580 or a locking member such as the locking member 600 at all, and may instead provide a different mechanism for mating the imaging unit 152 with the coupler 154.

In light of the above description, it should be appreciated that, as far as the physical interface between the imaging unit 152 and the coupler 154 is concerned, the imaging unit 152 that is formed when the adapter 152*a* is mated with the camera head 152*b* can be made identical in all respects to the imaging unit 152 of embodiment of FIGS. 6–8. Additionally, by properly adjusting the refractive index of the lens 200 to account for the increased distance between the distal end 660 and the image sensor 156 in the embodiment of FIGS. 9–10 as compared to the embodiment of FIGS. 6–8, the imaging unit 152 of FIGS. 9–10 can also be made to mimic the functional characteristics of the imaging unit 152 of FIGS. 6–8 as well. The use of the adapter 152*a* of FIGS. 9–10 therefore enables a standard camera head (e.g., the camera head 152*b*) to be adapted for use with the inventive coupler 154 described herein in the same manner as in the embodiment of the imaging unit 152 described in connection with FIGS. 6–8. Therefore, one already in possession of a camera head 152*b* (e.g., a standard C-mount or V-mount camera head) may simply purchase the adapter 152*a*(which does not include an image sensor) for use with the coupler 154, rather than purchasing the imaging unit 152 of FIGS. 6–8 (which additionally includes an image sensor) for use therewith.

The adapter 152*a* described herein is configured for use with a specific type of coupler (i.e., the coupler 154). However, it should be appreciated that the adapter 152*a* may alternatively be configured for use with other types of devices or couplers.

It should be appreciated that any suitable type of camera can be used to take such images, as the present invention is not limited to the above-described examples. Additional examples of cameras that can be suitable for use in such a system are described in a series of Applicant's earlier-filed U.S. patent applications, including provisional applications 60/054,197; 60/054,198; and 60/121,382, as well as regular U.S. patent applications Ser. Nos. 09/126,368; 09/382,496; and 09/513,673, each of which is incorporated herein by reference. However, the present invention is not limited to using such camera systems.

The apparatus 20 and method of use described herein can be used in connection with inspection and/or maintenance of numerous types of objects, as the present invention is not limited in this respect. The apparatus 20 and method of use described herein can be used in connection with inspection and/or maintenance of: aircraft (e.g., airplanes and helicopters), boats, automobiles, trucks, military equipment (e.g., tanks, weapons, etc.) and space vehicles; engines and related components, including aircraft engines, ship engines, motor vehicle engines and turbine engines; structural components of vehicles, such as airframes, hulls, chassis and automobile frames and other such components; structures such as buildings, roads, bridges, tunnels, etc.; facilities such as manufacturing plants and power plants including the components or objects relating to such facilities; mechanical components; systems; parts; inventory; products; processes; fluids and flows; and chemicals. Other applications for the apparatus include, but are not limited to, capturing, storing and retrieving information, such as maintenance and/or inspection information, regarding: process control; inventory management and control; cargo inspection by customs agents; searches conducted by law enforcement officials; surveillance; and obtaining diagnostic and other information by doctors and other medical professionals. Other applications will be readily apparent to those of skill.

It should be appreciated that various combinations of the above-described embodiments of the present invention can be employed together, but each aspect of the present invention can be used separately. Therefore, although the specific embodiments disclosed in the figures and described in detail employ particular combinations of the above-discussed features of the present invention, it should be appreciated that the present invention is not limited in this respect, as the various aspects of the present invention can be employed separately, or in different combinations. Thus, the particular embodiments described in detail are provided for illustrative purposes only.

What is claimed is:

1. A method of inspecting an aircraft or an aircraft component from a remote location, the method comprising acts of:

loading a desired maintenance program into an inspection apparatus, the apparatus having a computer and a camera control unit coupled to the computer and adapted to receive and process images from an imager that is housed separately from the camera control unit, the apparatus being capable of capturing, together with the imager, both a streaming video digital image of the aircraft or aircraft component and a still digital image of the aircraft or aircraft component;

instructing the same apparatus to capture, together with the imager, at least one of a) the streaming video digital image of the aircraft or an aircraft component at a first location and b) the still digital image of the aircraft or an aircraft component at a first location;

operating the same apparatus to enter in the program remarks about the aircraft or aircraft component, the remarks including at least one of notes regarding a condition of the aircraft or aircraft component, a date the image was taken, an identification of the aircraft or the aircraft component, and an identification of a person using the apparatus;

instructing the same apparatus to electronically transmit the at least one of streaming video digital image, still digital image and remarks to a second location remote from the first location;

reviewing the at least one of streaming video digital image, still digital image and the remarks at the second location;

preparing instructions based on at least one of the streaming video digital image, still digital image and remarks;

transmitting instructions back to the first location; and performing maintenance on the aircraft or an aircraft component in response to the instructions.

2. The method according to claim 1, further comprising an act of storing, in the apparatus, at least one of an image of the initial condition of the aircraft or aircraft component, maintenance history of the aircraft or aircraft component, diagnostic information regarding the aircraft or aircraft component and instructional information regarding the aircraft or aircraft component.

3. The method according to claim 1, further comprising an act of operating the same apparatus to enter in the program audio data regarding the aircraft or aircraft component.

4. The method according to claim 3, further comprising an act of instructing the same apparatus to electronically transmit the audio data to the second location.

5. The method according to claim 1, further comprising an act of obtaining an error code regarding the aircraft or aircraft component.

6. The method according to claim 5, further comprising an act of instructing same apparatus to electronically transmit the error code to the second location.

7. The method according to claim 1, wherein the act of entering remarks in the program about the aircraft or aircraft component comprises an act of inputting in the program at least one of text and voice.

8. The method according to claim 1, wherein the act of instructing the same apparatus to transmit the image comprises an act of instructing the same apparatus to transmit the image via a wireless connection.

9. The method according to claim 1, wherein the act of instructing the same apparatus to the image comprises an act of instructing the same apparatus to transit the image via the Internet.

10. The method according to claim 1, wherein the act of instructing the apparatus to capture, together with the imager, at least one of a) a streaming video digital image of the aircraft or aircraft component at a first location or b) still digital image of the aircraft or aircraft component at a first location comprises an act of instructing the apparatus to capture, together with the imager, a still digital image of the aircraft or aircraft component at a first location.

11. The method according to claim 1, wherein the act of instructing the apparatus to capture, together with the imager at least one of a) a streaming video digital image of the aircraft or aircraft component at a first location or b) a still digital image of the aircraft or aircraft component at a first location comprises an act of instructing the apparatus to capture, together with the imager, a streaming video digital image of the aircraft or aircraft component at a first location.

12. The method according to claim 1, wherein the act of instructing the same apparatus to electronically transmit the at least one of streaming video digital image and still digital image comprises an act of instructing the same apparatus to electronically transmit the at least one of streaming video digital image and still to at least one of a manufacturer of the aircraft and a manufacturer of the aircraft component.

13. The method according to claim 1, wherein the act of instructing the same apparatus to electronically transmit the at least one of streaming video digital image and still digital image comprises an act of instructing the same apparatus to electronically transmit the at least one of streaming video digital image and still image to an aircraft maintenance facility.

14. The method according to claim 1, wherein the act of transmitting instructions to the first location comprises an act of transmitting maintenance instructions to the first location.

* * * * *